United States Patent
Shauh et al.

(10) Patent No.: US 9,641,986 B2
(45) Date of Patent: May 2, 2017

(54) PRIORITIZATION OF CONCURRENT INTER-FREQUENCY/INTER-RAT MEASUREMENT AND EMBMS SERVICE RECEPTION

(71) Applicant: QUALCOMM Incorporated, San Diego, CA (US)

(72) Inventors: Jack Shyh-Hurng Shauh, San Diego, CA (US); Shailesh Maheshwari, San Diego, CA (US); Sivaramakrishna Veerepalli, San Diego, CA (US); Daniel Amerga, San Diego, CA (US); Kuo-Chun Lee, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 192 days.

(21) Appl. No.: 14/692,650

(22) Filed: Apr. 21, 2015

(65) Prior Publication Data
US 2016/0316345 A1   Oct. 27, 2016

(51) Int. Cl.
*H04W 4/06* (2009.01)
*H04W 36/00* (2009.01)
*H04L 29/06* (2006.01)
*H04W 24/08* (2009.01)

(52) U.S. Cl.
CPC ........... *H04W 4/06* (2013.01); *H04L 65/4076* (2013.01); *H04W 24/08* (2013.01); *H04W 36/0094* (2013.01)

(58) Field of Classification Search
CPC .. H04L 65/4076; H04W 72/005; H04W 4/06; H04W 24/08; H04W 36/0094
See application file for complete search history.

(56) References Cited

U.S. PATENT DOCUMENTS

| 8,837,433 B2 | 9/2014 | Amerga et al. |
| 2007/0030830 A1 | 2/2007 | Sagne et al. |

(Continued)

OTHER PUBLICATIONS

International Search Report and Written Opinion—PCT/US2016/21380—ISA/EPO—Jun. 6, 2016.

(Continued)

*Primary Examiner* — Pao Sinkantarakorn
*Assistant Examiner* — Kabir Jahangir
(74) *Attorney, Agent, or Firm* — Arent Fox LLP

(57) ABSTRACT

A method, an apparatus, and a computer-readable medium for wireless communication are provided. The apparatus may be a UE. The UE receives MBMS in an MBMS session from a base station. The UE determines a data receipt metric associated with data received during the MBMS subframes in the MBMS session. A portion of the MBMS subframes coincides with a measurement gap configured for inter-frequency or inter-RAT measurement. The UE determines whether the data receipt metric is in a first relationship with a first threshold. When the data receipt metric is in the first relationship with the first threshold, the UE refrains from receiving the data during at least the portion of the MBMS subframes that coincides with the measurement gap and performs the inter-frequency or inter-RAT measurement during the measurement gap when the data receipt metric is in the first relationship with the first threshold.

27 Claims, 16 Drawing Sheets

(56) References Cited

U.S. PATENT DOCUMENTS

| | | | | |
|---|---|---|---|---|
| 2010/0267394 A1* | 10/2010 | Wu | ................ | H04W 24/10 |
| | | | | 455/450 |
| 2013/0155881 A1* | 6/2013 | Amerga | ................ | H04W 4/06 |
| | | | | 370/252 |
| 2014/0169255 A1 | 6/2014 | Zhang et al. | | |
| 2014/0269397 A1 | 9/2014 | Pelletier et al. | | |
| 2015/0009821 A1 | 1/2015 | Sridhar et al. | | |
| 2015/0049600 A1 | 2/2015 | Balasubramanian et al. | | |

OTHER PUBLICATIONS

NTT DOCOMO: "Effects of Mobility Measurements on MBMS Selective Combining," 3GPP Draft; R1-040304, 3rd Generation Partnership Project (3GPP), Mobile Competence Centre ; 650, Route Des Lucioles ; F-06921 Sophia-Antipolis Cedex ; France, vol. RAN WG1, no. Malaga, Spain; Feb. 16, 2004, Feb. 16, 2004 (Feb. 16, 2004), XP050098627, [retrieved on Feb. 16, 2004], 5 pages.

Watson Netflix T Stockhammer NOMOR Research M Luby Qualcomm Incorporated M: "Raptor FEC Schemes for FECFRAME; draft-ietf-fecframe-raptor-10.txt," Raptor Fec Schemes for Fecframe; Draft-Ietf-1 Fecframe-Raptor-10.TXT, Internet Engineering Task Force, IETF; Standardworkingdraft, Internet Society (ISOC) 4, Rue Des Falaises CH—1205 Geneva, Switzerland, Mar. 1, 2012 (Mar. 1, 2012), pp. 1-23, XP015080922, [retrieved on Mar. 1, 2012].

\* cited by examiner

PRIORITIZATION OF CONCURRENT INTER-FREQUENCY/INTER-RAT MEASUREMENT AND EMBMS SERVICE RECEPTION

BACKGROUND

Field

The present disclosure relates generally to communication systems, and more particularly, to techniques of determining priorities of concurrent inter-frequency or inter-radio access technology (RAT) measurement and evolved multimedia broadcast multicast service (eMBMS) reception at a user equipment (UE).

Background

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is Long Term Evolution (LTE). LTE is a set of enhancements to the Universal Mobile Telecommunications System (UMTS) mobile standard promulgated by Third Generation Partnership Project (3GPP). LTE is designed to better support mobile broadband Internet access by improving spectral efficiency, lowering costs, improving services, making use of new spectrum, and better integrating with other open standards using OFDMA on the downlink (DL), SC-FDMA on the uplink (UL), and multiple-input multiple-output (MIMO) antenna technology. However, as the demand for mobile broadband access continues to increase, there exists a need for further improvements in LTE technology. Preferably, these improvements should be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

According to an example, a method for determining priorities of concurrent inter-frequency or inter-RAT measurement and eMBMS reception at a UE is provided. The method includes receiving multimedia broadcast multicast service (MBMS) subframes in an MBMS session from a base station. The method further includes determining a data receipt metric associated with data received during the MBMS subframes in the MBMS session. A portion of the MBMS subframes coincides with a measurement gap configured for inter-frequency or inter-RAT measurement. The method further includes determining whether the data receipt metric is in a first relationship with a first threshold. The method further includes refraining from receiving the data during at least the portion of the MBMS subframes that coincides with the measurement gap based on a determination that the data receipt metric is in the first relationship with the first threshold. Moreover, the method includes performing the inter-frequency or inter-RAT measurement during the measurement gap in response to the determination that the data receipt metric is in the first relationship with the first threshold.

According to another example, a computer-readable medium comprising code for determining priorities of concurrent inter-frequency or inter-RAT measurement and eMBMS reception at a UE is provided. The apparatus may be a UE. The UE receives MBMS subframes in an MBMS session from a base station. The UE determines a data receipt metric associated with data received during the MBMS subframes in the MBMS session. A portion of the MBMS subframes coincides with a measurement gap configured for inter-frequency or inter-RAT measurement. The UE determines whether the data receipt metric is in a first relationship with a first threshold. The UE refrains from receiving the data during at least the portion of the MBMS subframes that coincides with the measurement gap based on a determination that the data receipt metric is in the first relationship with the first threshold. The UE performs the inter-frequency or inter-RAT measurement during the measurement gap in response to the determination that the data receipt metric is in the first relationship with the first threshold.

According to an example, an apparatus for determining priorities of concurrent inter-frequency or inter-RAT measurement and eMBMS reception at a UE is provided. The apparatus includes means for receiving MBMS subframes in an MBMS session from a base station. The apparatus includes means for determining a data receipt metric associated with data received during the MBMS subframes in the MBMS session. A portion of the MBMS subframes coincides with a measurement gap configured for inter-frequency or inter-RAT measurement. The apparatus includes means for determining whether the data receipt metric is in a first relationship with a first threshold. The apparatus includes means for refraining from receiving the data during at least the portion of the MBMS subframes that coincides with the measurement gap based on a determination that the data receipt metric is in the first relationship with the first threshold. Moreover, the apparatus includes means for performing the inter-frequency or inter-RAT measurement during the measurement gap in response to the determination that the data receipt metric is in the first relationship with the first threshold.

According to an example, a computer-readable medium comprising code for determining priorities of concurrent inter-frequency or inter-RAT measurement and eMBMS reception at a UE is provided. The code includes code for receiving MBMS subframes in an MBMS session from a base station. The code includes code for determining a data receipt metric associated with data received during the MBMS subframes in the MBMS session. A portion of the MBMS subframes coincides with a measurement gap configured for inter-frequency or inter-RAT measurement. The code includes code for determining whether the data receipt metric is in a first relationship with a first threshold. The code includes code for refraining from receiving the data during at least the portion of the MBMS subframes that coincides with the measurement gap based on a determination that the data receipt metric is in the first relationship with the first threshold. Moreover, the code includes code for performing the inter-frequency or inter-RAT measurement during the measurement gap in response to the determination that the data receipt metric is in the first relationship with the first threshold.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
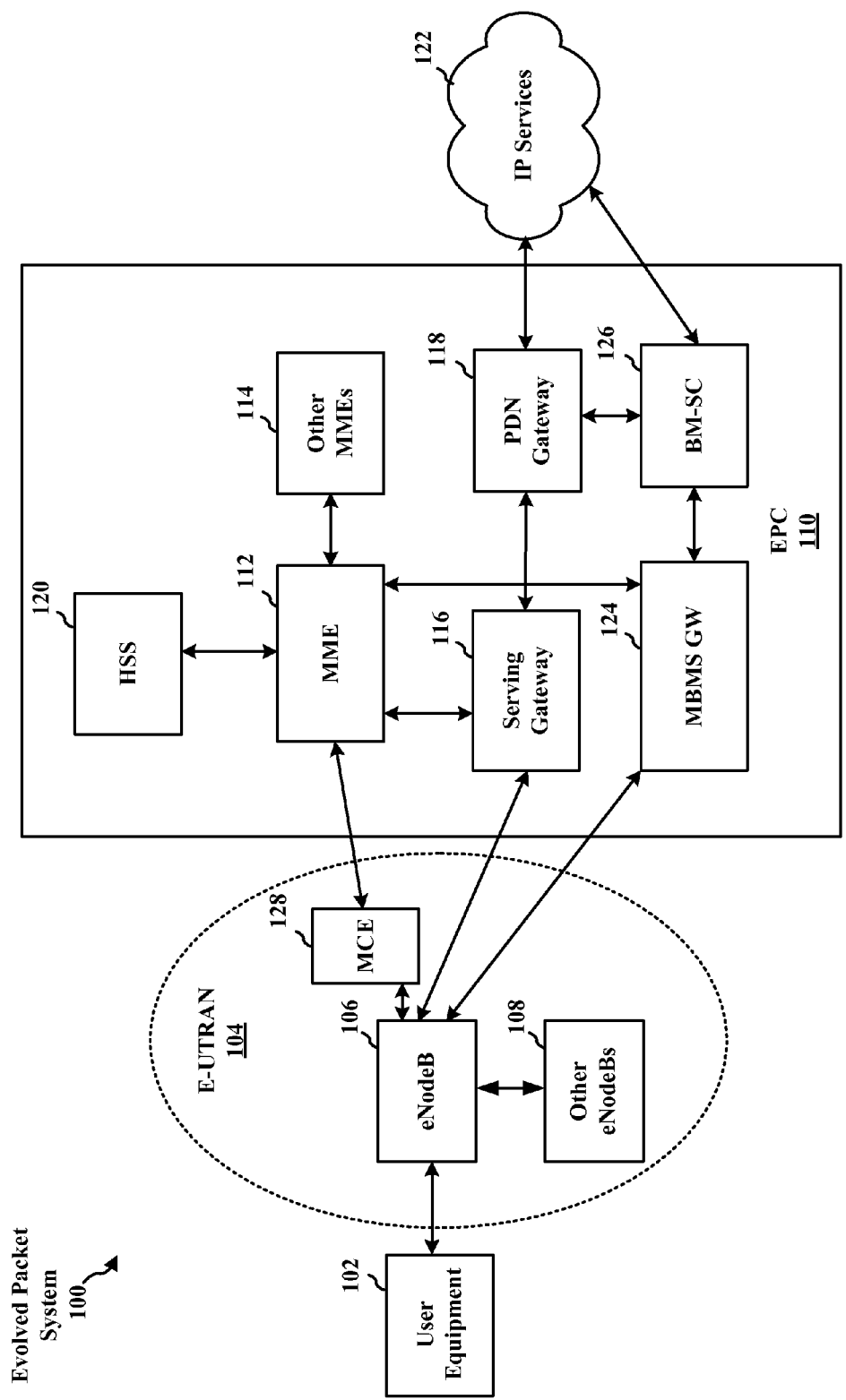
FIG. 1 is a diagram illustrating an example of a network architecture.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Accordingly, in one or more exemplary embodiments, the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), compact disk ROM (CD-ROM) or other optical disk storage, magnetic disk storage or other magnetic storage devices, combinations of the aforementioned types of computer-readable media, or any other medium that can be used to store computer executable code in the form of instructions or data structures that can be accessed by a computer.

FIG. 1 is a diagram illustrating an LTE network architecture 100. The LTE network architecture 100 may be referred to as an Evolved Packet System (EPS) 100. The EPS 100 may include one or more user equipment (UE) 102, an Evolved UMTS Terrestrial Radio Access Network (E-UTRAN) 104, an Evolved Packet Core (EPC) 110, and an Operator's Internet Protocol (IP) Services 122. The EPS can interconnect with other access networks, but for simplicity those entities/interfaces are not shown. As shown, the EPS provides packet-switched services, however, as those skilled in the art will readily appreciate, the various concepts presented throughout this disclosure may be extended to networks providing circuit-switched services.

The E-UTRAN includes the evolved Node B (eNB) 106 and other eNBs 108, and may include a Multicast Coordination Entity (MCE) 128. The eNB 106 provides user and control planes protocol terminations toward the UE 102. The eNB 106 may be connected to the other eNBs 108 via a backhaul (e.g., an X2 interface). The MCE 128 allocates time/frequency radio resources for evolved Multimedia Broadcast Multicast Service (MBMS) (eMBMS), and determines the radio configuration (e.g., a modulation and coding scheme (MCS)) for the eMBMS. The MCE 128 may be a separate entity or part of the eNB 106. The eNB 106 may also be referred to as a base station, a Node B, an access point, a base transceiver station, a radio base station, a radio transceiver, a transceiver function, a basic service set (BSS), an extended service set (ESS), or some other suitable terminology. The eNB 106 provides an access point to the EPC 110 for a UE 102. Examples of UEs 102 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, or any other similar functioning device. The UE 102 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

The eNB 106 is connected to the EPC 110. The EPC 110 may include a Mobility Management Entity (MME) 112, a Home Subscriber Server (HSS) 120, other MMEs 114, a Serving Gateway 116, a Multimedia Broadcast Multicast Service (MBMS) Gateway 124, a Broadcast Multicast Service Center (BM-SC) 126, and a Packet Data Network (PDN) Gateway 118. The MME 112 is the control node that processes the signaling between the UE 102 and the EPC 110. Generally, the MME 112 provides bearer and connection management. All user IP packets are transferred through the Serving Gateway 116, which itself is connected to the PDN Gateway 118. The PDN Gateway 118 provides UE IP address allocation as well as other functions. The PDN Gateway 118 and the BM-SC 126 are connected to the IP Services 122. The IP Services 122 may include the Internet, an intranet, an IP Multimedia Subsystem (IMS), a PS Streaming Service (PSS), and/or other IP services. The BM-SC 126 may provide functions for MBMS user service provisioning and delivery. The BM-SC 126 may serve as an entry point for content provider MBMS transmission, may be used to authorize and initiate MBMS Bearer Services within a PLMN, and may be used to schedule and deliver MBMS transmissions. The MBMS Gateway 124 may be used to distribute MBMS traffic to the eNBs (e.g., 106, 108) belonging to a Multicast Broadcast Single Frequency Network (MBSFN) area broadcasting a particular service, and may be responsible for session management (start/stop) and for collecting eMBMS related charging information.

Figure 2:
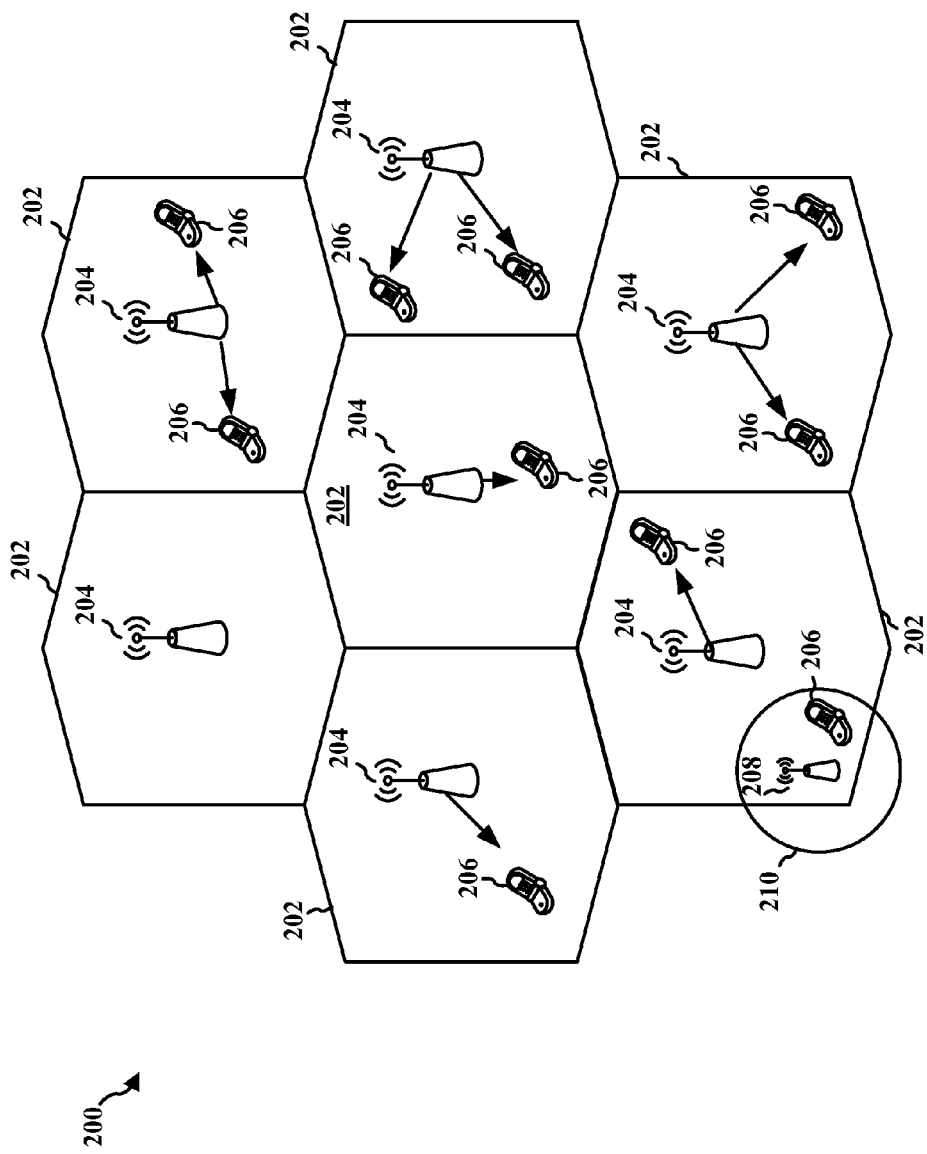
FIG. 2 is a diagram illustrating an example of an access network.

FIG. 2 is a diagram illustrating an example of an access network 200 in an LTE network architecture. In this example, the access network 200 is divided into a number of cellular regions (cells) 202. One or more lower power class eNBs 208 may have cellular regions 210 that overlap with one or more of the cells 202. The lower power class eNB 208 may be a femto cell (e.g., home eNB (HeNB)), pico cell, micro cell, or remote radio head (RRH). The macro eNBs 204 are each assigned to a respective cell 202 and are configured to provide an access point to the EPC 110 for all the UEs 206 in the cells 202. There is no centralized controller in this example of an access network 200, but a centralized controller may be used in alternative configurations. The eNBs 204 are responsible for all radio related functions including radio bearer control, admission control, mobility control, scheduling, security, and connectivity to the serving gateway 116. An eNB may support one or multiple (e.g., three) cells (also referred to as a sectors). The term "cell" can refer to the smallest coverage area of an eNB and/or an eNB subsystem serving a particular coverage area. Further, the terms "eNB," "base station," and "cell" may be used interchangeably herein.

The modulation and multiple access scheme employed by the access network 200 may vary depending on the particular telecommunications standard being deployed. In LTE applications, OFDM is used on the DL and SC-FDMA is used on the UL to support both frequency division duplex (FDD) and time division duplex (TDD). As those skilled in the art will readily appreciate from the detailed description to follow, the various concepts presented herein are well suited for LTE applications. However, these concepts may be readily extended to other telecommunication standards employing other modulation and multiple access techniques. By way of example, these concepts may be extended to Evolution-Data Optimized (EV-DO) or Ultra Mobile Broadband (UMB). EV-DO and UMB are air interface standards promulgated by the 3rd Generation Partnership Project 2 (3GPP2) as part of the CDMA2000 family of standards and employs CDMA to provide broadband Internet access to mobile stations. These concepts may also be extended to Universal Terrestrial Radio Access (UTRA) employing Wideband-CDMA (W-CDMA) and other variants of CDMA, such as TD-SCDMA; Global System for Mobile Communications (GSM) employing TDMA; and Evolved UTRA (E-UTRA), IEEE 802.11 (Wi-Fi), IEEE 802.16 (WiMAX), IEEE 802.20, and Flash-OFDM employing OFDMA. UTRA, E-UTRA, UMTS, LTE and GSM are described in documents from the 3GPP organization. CDMA2000 and UMB are described in documents from the 3GPP2 organization. The actual wireless communication standard and the multiple access technology employed will depend on the specific application and the overall design constraints imposed on the system.

The eNBs 204 may have multiple antennas supporting MIMO technology. The use of MIMO technology enables the eNBs 204 to exploit the spatial domain to support spatial multiplexing, beamforming, and transmit diversity. Spatial multiplexing may be used to transmit different streams of data simultaneously on the same frequency. The data streams may be transmitted to a single UE 206 to increase the data rate or to multiple UEs 206 to increase the overall system capacity. This is achieved by spatially precoding each data stream (i.e., applying a scaling of an amplitude and a phase) and then transmitting each spatially precoded stream through multiple transmit antennas on the DL. The spatially precoded data streams arrive at the UE(s) 206 with different spatial signatures, which enables each of the UE(s) 206 to recover the one or more data streams destined for that UE 206. On the UL, each UE 206 transmits a spatially precoded data stream, which enables the eNB 204 to identify the source of each spatially precoded data stream.

Spatial multiplexing is generally used when channel conditions are good. When channel conditions are less favorable, beamforming may be used to focus the transmission energy in one or more directions. This may be achieved by spatially precoding the data for transmission through multiple antennas. To achieve good coverage at the edges of the cell, a single stream beamforming transmission may be used in combination with transmit diversity.

In the detailed description that follows, various aspects of an access network will be described with reference to a MIMO system supporting OFDM on the DL. OFDM is a spread-spectrum technique that modulates data over a number of subcarriers within an OFDM symbol. The subcarriers are spaced apart at precise frequencies. The spacing provides "orthogonality" that enables a receiver to recover the data from the subcarriers. In the time domain, a guard interval (e.g., cyclic prefix) may be added to each OFDM symbol to combat inter-OFDM-symbol interference. The UL may use SC-FDMA in the form of a DFT-spread OFDM signal to compensate for high peak-to-average power ratio (PAPR).

Figure 3:
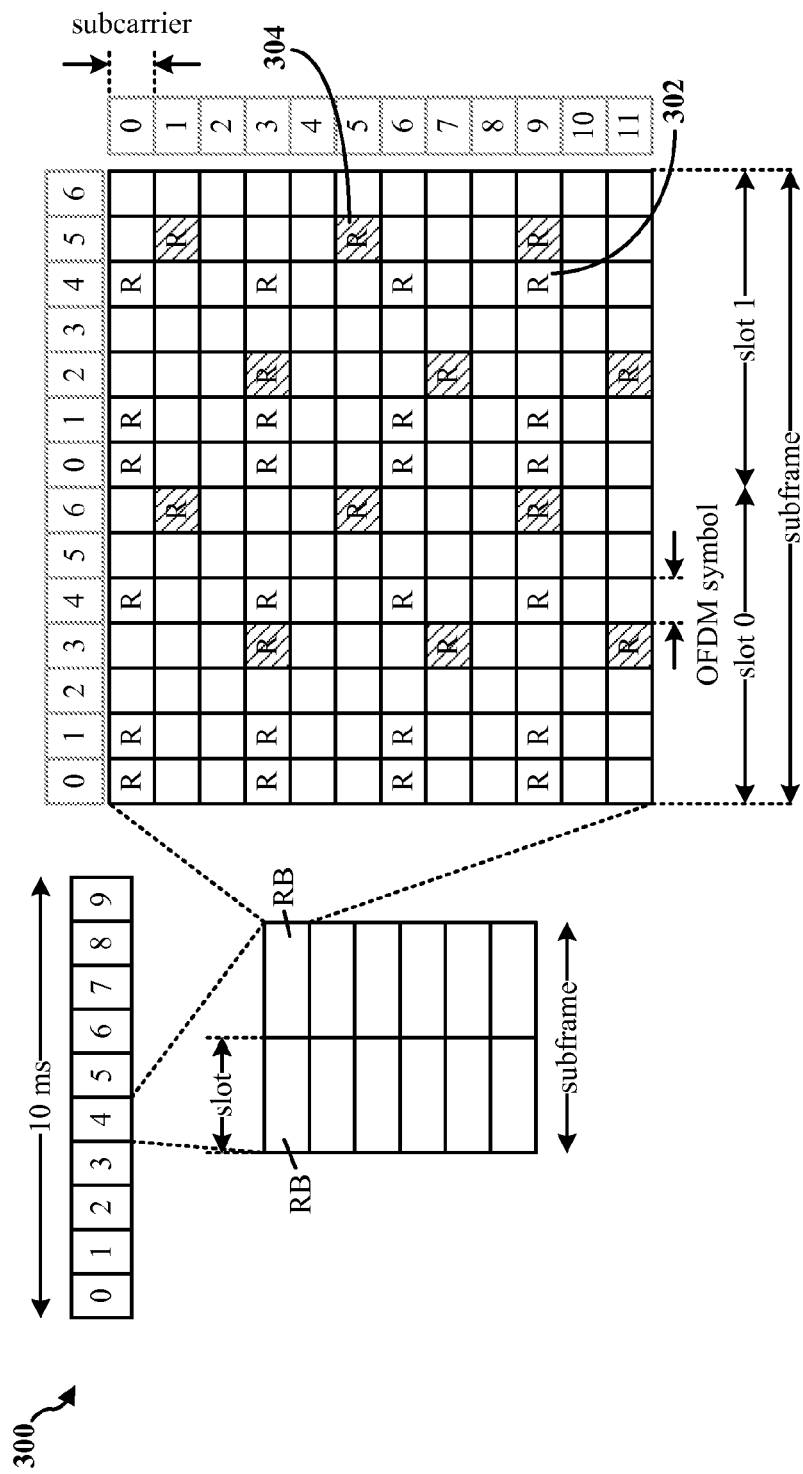
FIG. 3 is a diagram illustrating an example of a DL frame structure in LTE.

FIG. 3 is a diagram 300 illustrating an example of a DL frame structure in LTE. A frame (10 ms) may be divided into 10 equally sized subframes. Each subframe may include two consecutive time slots. A resource grid may be used to represent two time slots, each time slot including a resource block. The resource grid is divided into multiple resource elements. In LTE, for a normal cyclic prefix, a resource block contains 12 consecutive subcarriers in the frequency domain and 7 consecutive OFDM symbols in the time domain, for a total of 84 resource elements. For an extended cyclic prefix, a resource block contains 12 consecutive subcarriers in the frequency domain and 6 consecutive OFDM symbols in the time domain, for a total of 72 resource elements. Some of the resource elements, indicated as R 302, 304, include DL reference signals (DL-RS). The DL-RS include Cell-specific RS (CRS) (also sometimes called common RS) 302 and UE-specific RS (UE-RS) 304. UE-RS 304 are transmitted on the resource blocks upon which the corresponding physical DL shared channel (PDSCH) is mapped. The number of bits carried by each resource element depends on the modulation scheme. Thus, the more resource blocks that a UE receives and the higher the modulation scheme, the higher the data rate for the UE.

Figure 4:
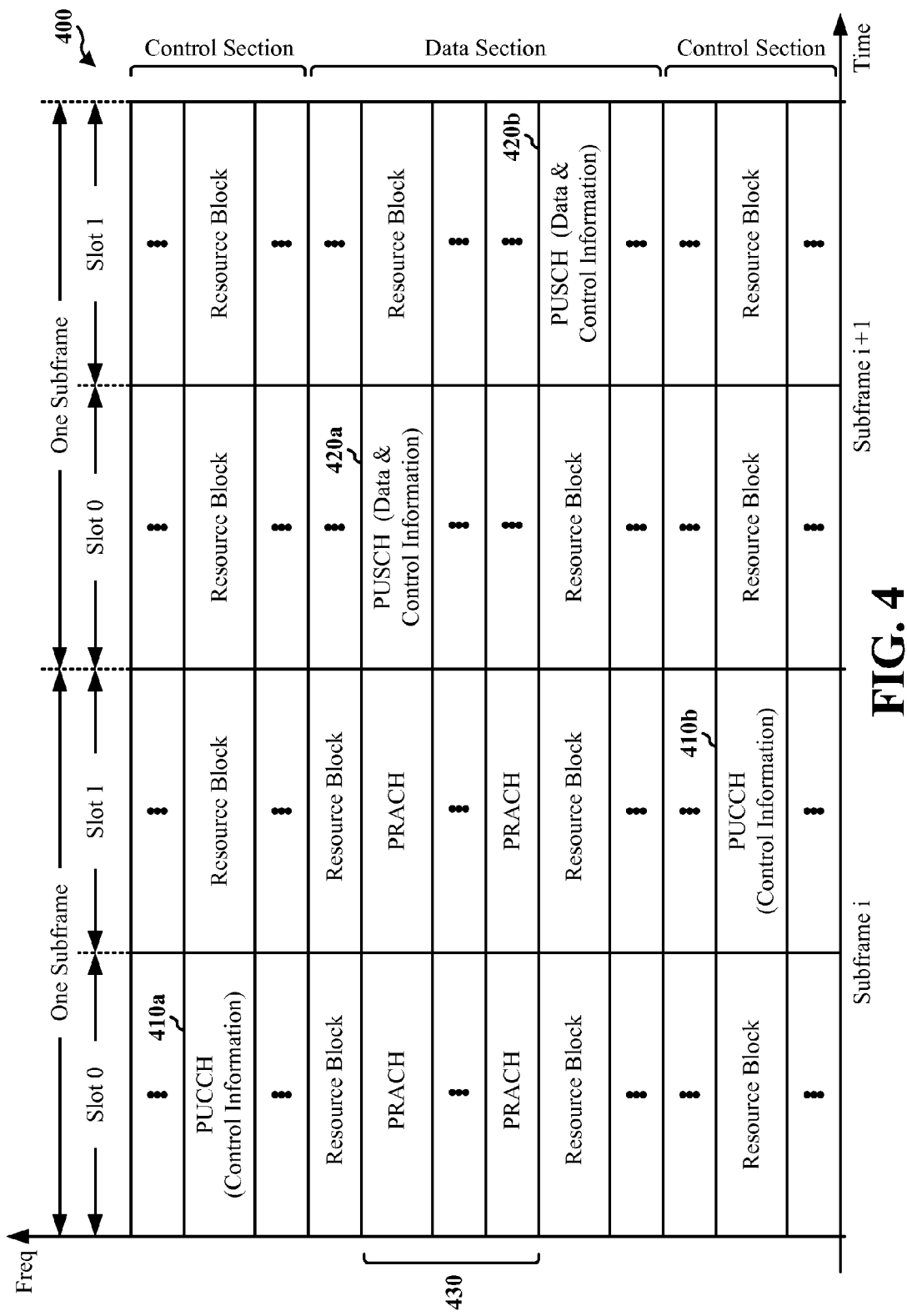
FIG. 4 is a diagram illustrating an example of an UL frame structure in LTE.

FIG. 4 is a diagram 400 illustrating an example of an UL frame structure in LTE. The available resource blocks for the UL may be partitioned into a data section and a control section. The control section may be formed at the two edges of the system bandwidth and may have a configurable size. The resource blocks in the control section may be assigned to UEs for transmission of control information. The data section may include all resource blocks not included in the control section. The UL frame structure results in the data section including contiguous subcarriers, which may allow a single UE to be assigned all of the contiguous subcarriers in the data section.

A UE may be assigned resource blocks 410a, 410b in the control section to transmit control information to an eNB. The UE may also be assigned resource blocks 420a, 420b in the data section to transmit data to the eNB. The UE may transmit control information in a physical UL control channel (PUCCH) on the assigned resource blocks in the control section. The UE may transmit data or both data and control information in a physical UL shared channel (PUSCH) on the assigned resource blocks in the data section. A UL transmission may span both slots of a subframe and may hop across frequency.

A set of resource blocks may be used to perform initial system access and achieve UL synchronization in a physical random access channel (PRACH) 430. The PRACH 430 carries a random sequence and cannot carry any UL data/signaling. Each random access preamble occupies a bandwidth corresponding to six consecutive resource blocks. The starting frequency is specified by the network. That is, the transmission of the random access preamble is restricted to certain time and frequency resources. There is no frequency hopping for the PRACH. The PRACH attempt is carried in a single subframe (1 ms) or in a sequence of few contiguous subframes and a UE can make a single PRACH attempt per frame (10 ms).

Figure 5:
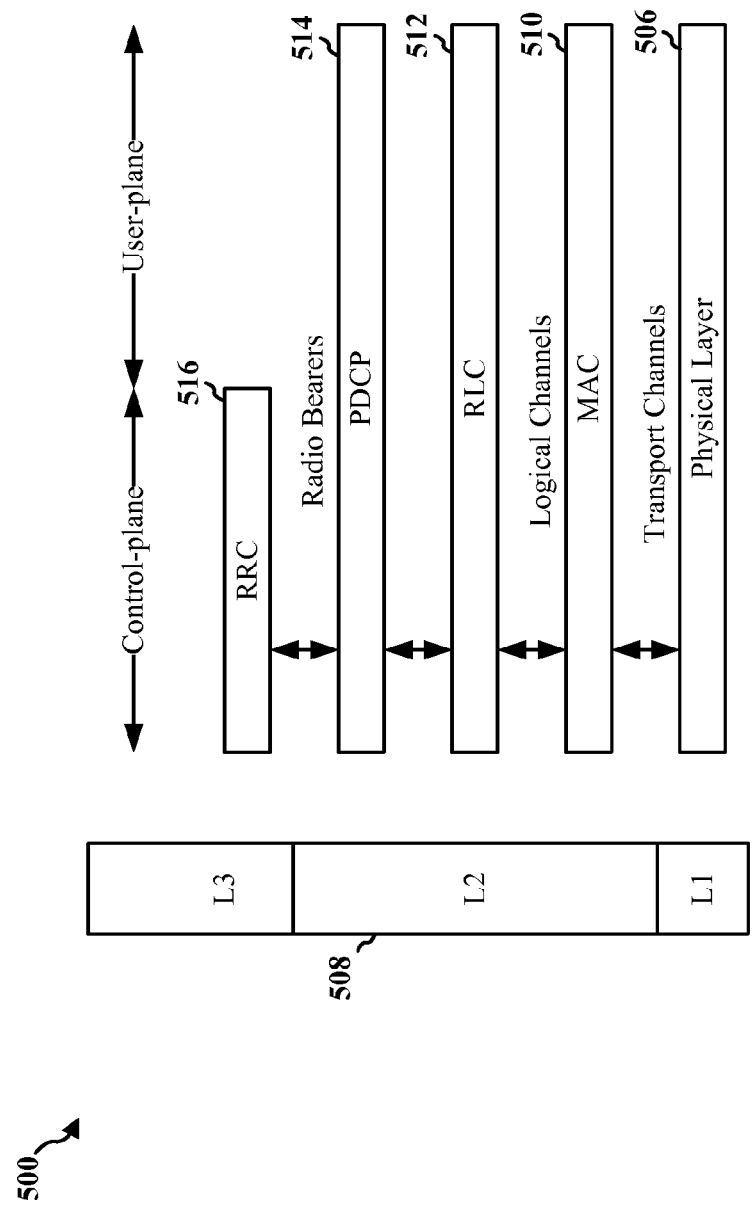
FIG. 5 is a diagram illustrating an example of a radio protocol architecture for the user and control planes.

FIG. 5 is a diagram 500 illustrating an example of a radio protocol architecture for the user and control planes in LTE. The radio protocol architecture for the UE and the eNB is shown with three layers: Layer 1, Layer 2, and Layer 3. Layer 1 (L1 layer) is the lowest layer and implements various physical layer signal processing functions. The L1 layer will be referred to herein as the physical layer 506. Layer 2 (L2 layer) 508 is above the physical layer 506 and is responsible for the link between the UE and eNB over the physical layer 506.

In the user plane, the L2 layer 508 includes a media access control (MAC) sublayer 510, a radio link control (RLC) sublayer 512, and a packet data convergence protocol (PDCP) 514 sublayer, which are terminated at the eNB on the network side. Although not shown, the UE may have several upper layers above the L2 layer 508 including a network layer (e.g., IP layer) that is terminated at the PDN gateway 118 on the network side, and an application layer that is terminated at the other end of the connection (e.g., far end UE, server, etc.).

The PDCP sublayer 514 provides multiplexing between different radio bearers and logical channels. The PDCP sublayer 514 also provides header compression for upper layer data packets to reduce radio transmission overhead, security by ciphering the data packets, and handover support for UEs between eNBs. The RLC sublayer 512 provides segmentation and reassembly of upper layer data packets, retransmission of lost data packets, and reordering of data packets to compensate for out-of-order reception due to hybrid automatic repeat request (HARM). The MAC sublayer 510 provides multiplexing between logical and transport channels. The MAC sublayer 510 is also responsible for allocating the various radio resources (e.g., resource blocks) in one cell among the UEs. The MAC sublayer 510 is also responsible for HARQ operations.

In the control plane, the radio protocol architecture for the UE and eNB is substantially the same for the physical layer 506 and the L2 layer 508 with the exception that there is no header compression function for the control plane. The control plane also includes a radio resource control (RRC) sublayer 516 in Layer 3 (L3 layer). The RRC sublayer 516 is responsible for obtaining radio resources (e.g., radio bearers) and for configuring the lower layers using RRC signaling between the eNB and the UE.

Figure 6:
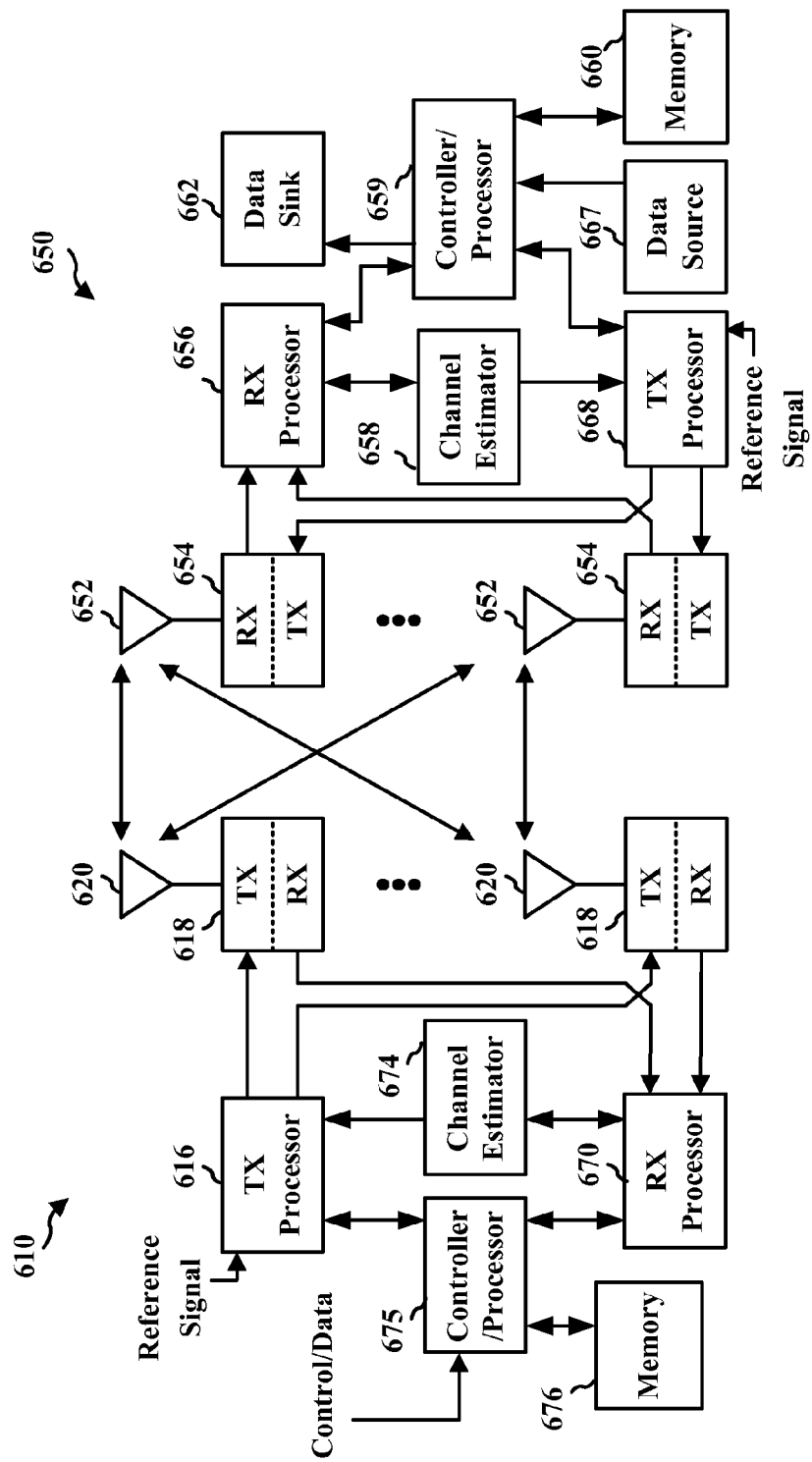
FIG. 6 is a diagram illustrating an example of an evolved Node B and user equipment in an access network.

FIG. 6 is a block diagram of an eNB 610 in communication with a UE 650 in an access network. In the DL, upper layer packets from the core network are provided to a controller/processor 675. The controller/processor 675 implements the functionality of the L2 layer. In the DL, the controller/processor 675 provides header compression, ciphering, packet segmentation and reordering, multiplexing between logical and transport channels, and radio resource allocations to the UE 650 based on various priority metrics. The controller/processor 675 is also responsible for HARQ operations, retransmission of lost packets, and signaling to the UE 650.

The transmit (TX) processor 616 implements various signal processing functions for the L1 layer (i.e., physical layer). The signal processing functions include coding and interleaving to facilitate forward error correction (FEC) at the UE 650 and mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols are then split into parallel streams. Each stream is then mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 674 may be used to determine the coding and modulation scheme, as well as for spatial processing. The channel estimate may be derived from a reference signal and/or channel condition feedback transmitted by the UE 650. Each spatial stream may then be provided to a different antenna 620 via a separate transmitter 618TX. Each transmitter 618TX may modulate an RF carrier with a respective spatial stream for transmission.

At the UE 650, each receiver 654RX receives a signal through its respective antenna 652. Each receiver 654RX recovers information modulated onto an RF carrier and provides the information to the receive (RX) processor 656. The RX processor 656 implements various signal processing functions of the L1 layer. The RX processor 656 may perform spatial processing on the information to recover any spatial streams destined for the UE 650. If multiple spatial streams are destined for the UE 650, they may be combined by the RX processor 656 into a single OFDM symbol stream. The RX processor 656 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the eNB 610. These soft decisions may be based on channel estimates computed by the channel estimator 658. The soft decisions are then decoded and deinterleaved to recover the data and control signals that were originally transmitted by the eNB 610 on the physical channel. The data and control signals are then provided to the controller/processor 659.

The controller/processor 659 implements the L2 layer. The controller/processor can be associated with a memory 660 that stores program codes and data. The memory 660 may be referred to as a computer-readable medium. In the UL, the controller/processor 659 provides demultiplexing between transport and logical channels, packet reassembly, deciphering, header decompression, control signal processing to recover upper layer packets from the core network. The upper layer packets are then provided to a data sink 662, which represents all the protocol layers above the L2 layer. Various control signals may also be provided to the data sink 662 for L3 processing. The controller/processor 659 is also responsible for error detection using an acknowledgement (ACK) and/or negative acknowledgement (NACK) protocol to support HARQ operations.

In the UL, a data source 667 is used to provide upper layer packets to the controller/processor 659. The data source 667 represents all protocol layers above the L2 layer. Similar to the functionality described in connection with the DL transmission by the eNB 610, the controller/processor 659 implements the L2 layer for the user plane and the control plane by providing header compression, ciphering, packet segmentation and reordering, and multiplexing between logical and transport channels based on radio resource allocations by the eNB 610. The controller/processor 659 is also responsible for HARQ operations, retransmission of lost packets, and signaling to the eNB 610.

Channel estimates derived by a channel estimator 658 from a reference signal or feedback transmitted by the eNB 610 may be used by the TX processor 668 to select the appropriate coding and modulation schemes, and to facilitate spatial processing. The spatial streams generated by the TX processor 668 may be provided to different antenna 652 via separate transmitters 654TX. Each transmitter 654TX may modulate an RF carrier with a respective spatial stream for transmission.

The UL transmission is processed at the eNB 610 in a manner similar to that described in connection with the receiver function at the UE 650. Each receiver 618RX receives a signal through its respective antenna 620. Each receiver 618RX recovers information modulated onto an RF carrier and provides the information to a RX processor 670. The RX processor 670 may implement the L1 layer.

The controller/processor 675 implements the L2 layer. The controller/processor 675 can be associated with a memory 676 that stores program codes and data. The memory 676 may be referred to as a computer-readable medium. In the UL, the controller/processor 675 provides demultiplexing between transport and logical channels, packet reassembly, deciphering, header decompression, control signal processing to recover upper layer packets from the UE 650. Upper layer packets from the controller/processor 675 may be provided to the core network. The controller/processor 675 is also responsible for error detection using an ACK and/or NACK protocol to support HARQ operations.

Figure 7:
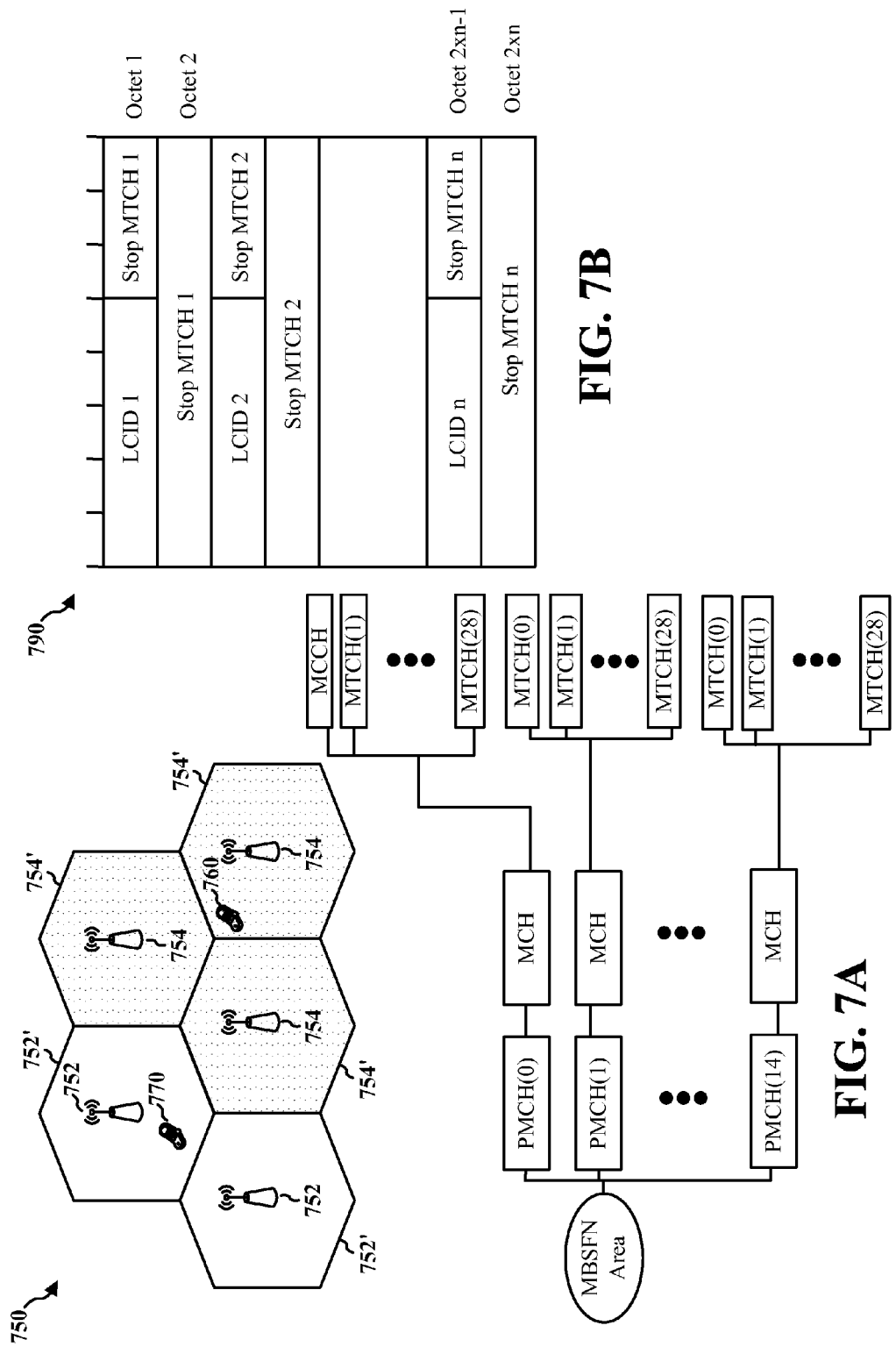
FIG. 7A is a diagram illustrating an example of an eMBMS channel configuration in a Multicast Broadcast Single Frequency Network.
FIG. 7B is a diagram illustrating a format of a Multicast Channel Scheduling Information Media Access Control control element.

FIG. 7A is a diagram 750 illustrating an example of an evolved MBMS (eMBMS) channel configuration in an MBSFN. The eNBs 752 in cells 752' may form a first MBSFN area and the eNBs 754 in cells 754' may form a second MBSFN area. The eNBs 752, 754 may each be associated with other MBSFN areas, for example, up to a total of eight MBSFN areas. A cell within an MBSFN area may be designated a reserved cell. Reserved cells do not provide multicast/broadcast content, but are time-synchronized to the cells 752', 754' and may have restricted power on MBSFN resources in order to limit interference to the MBSFN areas. Each eNB in an MBSFN area synchronously transmits the same eMBMS control information and data. Each area may support broadcast, multicast, and unicast services. A unicast service is a service intended for a specific user, e.g., a voice call. A multicast service is a service that may be received by a group of users, e.g., a subscription video service. A broadcast service is a service that may be received by all users, e.g., a news broadcast. Referring to FIG. 7A, the first MBSFN area may support a first eMBMS broadcast service, such as by providing a particular news broadcast to UE 770. The second MBSFN area may support a second eMBMS broadcast service, such as by providing a different news broadcast to UE 760. Each MBSFN area supports one or more physical multicast channels (PMCH) (e.g., 15 PMCHs). Each PMCH corresponds to a multicast channel (MCH). Each MCH can multiplex a plurality (e.g., 29) of multicast logical channels. Each MBSFN area may have one multicast control channel (MCCH). As such, one MCH may multiplex one MCCH and a plurality of multicast traffic channels (MTCHs) and the remaining MCHs may multiplex a plurality of MTCHs.

A UE can camp on an LTE cell to discover the availability of eMBMS service access and a corresponding access stratum configuration. Initially, the UE may acquire a system information block (SIB) 13 (SIB13). Subsequently, based on the SIB13, the UE may acquire an MBSFN Area Configuration message on an MCCH. Subsequently, based on the MBSFN Area Configuration message, the UE may acquire an MCH scheduling information (MSI) MAC control element. The SIB13 may include (1) an MBSFN area identifier of each MBSFN area supported by the cell; (2) information for acquiring the MCCH such as an MCCH repetition period (e.g., 32, 64, . . . , 256 frames), an MCCH offset (e.g., 0, 1, . . . , 10 frames), an MCCH modification period (e.g., 512, 1024 frames), a signaling modulation and coding scheme (MCS), subframe allocation information indicating which subframes of the radio frame as indicated by repetition period and offset can transmit MCCH; and (3) an MCCH change notification configuration. There is one MBSFN Area Configuration message for each MBSFN area. The MBSFN Area Configuration message may indicate (1) a temporary mobile group identity (TMGI) and an optional session identifier of each MTCH identified by a logical channel identifier within the PMCH, and (2) allocated resources (i.e., radio frames and subframes) for transmitting each PMCH of the MBSFN area and the allocation period (e.g., 4, 8, . . . , 256 frames) of the allocated resources for all the PMCHs in the area, and (3) an MCH scheduling period (MSP) (e.g., 8, 16, 32, . . . , or 1024 radio frames) over which the MSI MAC control element is transmitted.

FIG. 7B is a diagram 790 illustrating the format of an MSI MAC control element. The MSI MAC control element may be sent once each MSP. The MSI MAC control element may be sent in the first subframe of each scheduling period of the PMCH. The MSI MAC control element can indicate the stop frame and subframe of each MTCH within the PMCH. There may be one MSI per PMCH per MBSFN area.

Figure 8:
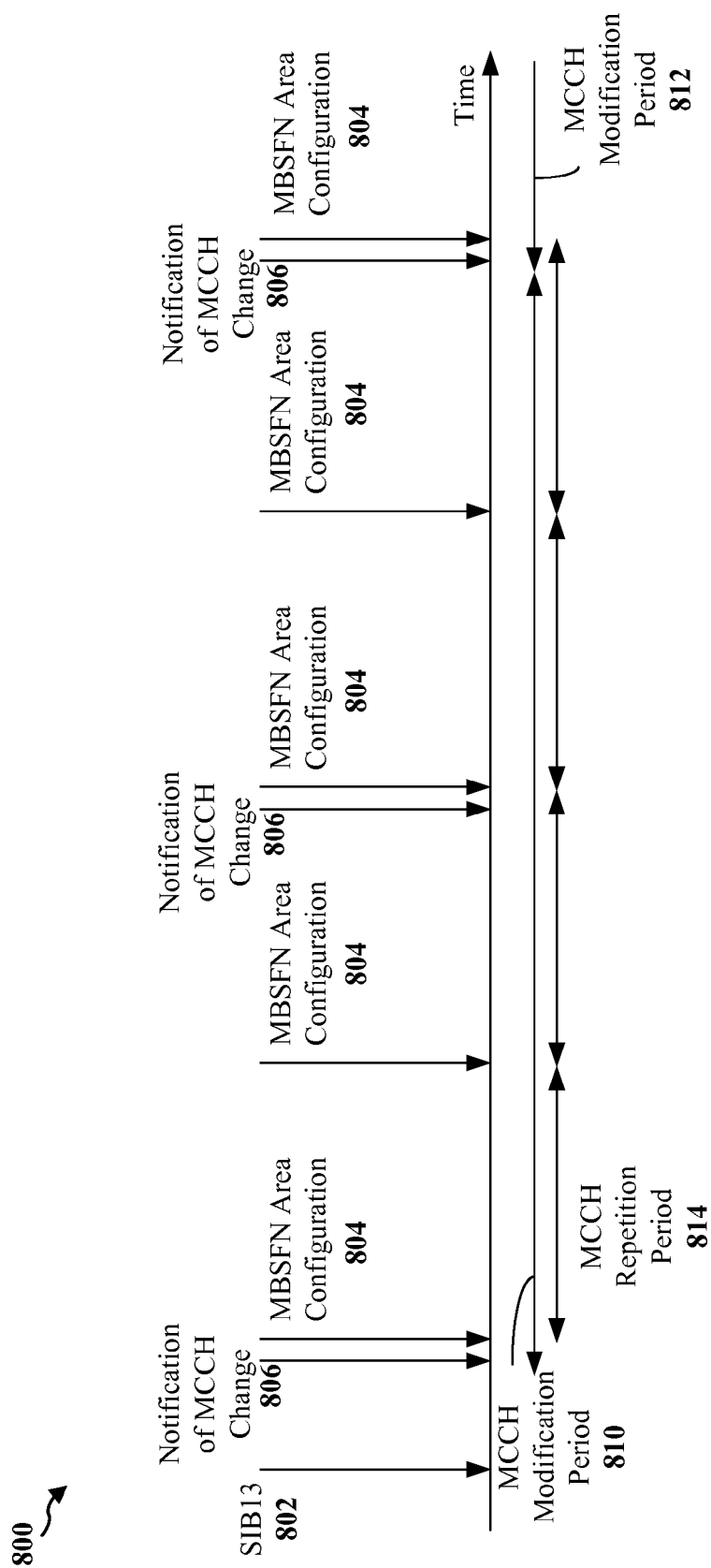
FIG. 8 is a diagram illustrating reception of some eMBMS content.

FIG. 8 is a diagram 800 for illustrating the reception of some eMBMS content. The eMBMS content includes control/system information such as a system information block 13 (SIB13), MCCH, MCH scheduling information (MSI), notification of MCCH change messages, traffic data such as MTCH(s), and other eMBMS related content. As shown in FIG. 8, a UE receives a SIB13 802. The SIB13 indicates the MBSFN area identifier (ID) of each MBSFN supported by the cell, non-MBSFN region length (1 or 2 symbols) per MBSFN area, an MCCH configuration per MBSFN area for receiving the MCCH and the MBSFN area configuration message 804 in the MCCH, and notification information for receiving the notification of MCCH change 806. The MBSFN area configuration message 804 is received each MCCH repetition period 814. The notification of MCCH change 806 and MBSFN area configuration 804 messages received in the MCCH modification period 810 apply in the subsequent MCCH modification period 812. While not shown in FIG. 8, a UE may receive MTCH(s) (i.e., traffic data) along with eMBMS control/system information.

Figure 9:
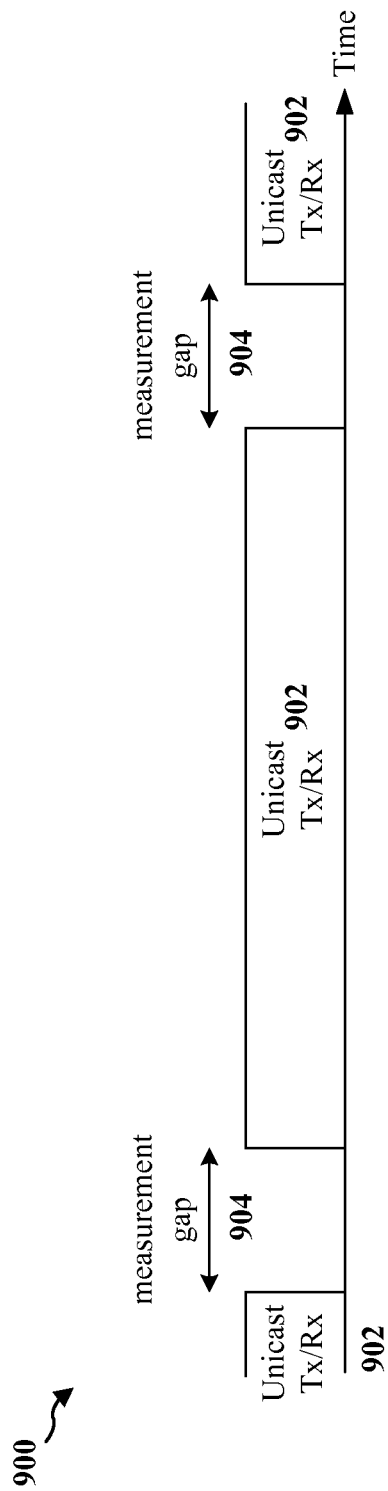
FIG. 9 is a diagram illustrating a measurement gap.

FIG. 9 is a diagram 900 for illustrating a measurement gap. While a UE is in an RRC connected (RRC_CONNECTED) state, the UE may be commanded by its serving cell to perform an inter-frequency or inter-RAT measurement and report the measurement results. An inter-frequency measurement is a measurement of a different frequency of a different cell in the same RAT. An inter-RAT measurement is a measurement of a different cell in a different RAT. The UE may be commanded to perform the measurement to prepare for an inter-frequency or inter-RAT handover. To avoid interruption of an existing unicast service 902, a measurement gap 904 is provided for the measurement in order to allow the UE to leave from the serving cell on one frequency and perform the measurement on another frequency. The measurement gap 904 is configured in an RRC connection reconfiguration (RRCConnectionReconfiguration) message. The measurement gap may be 6 ms long (i.e., 6 subframes) per 40 ms or 80 ms time period.

Figure 10:
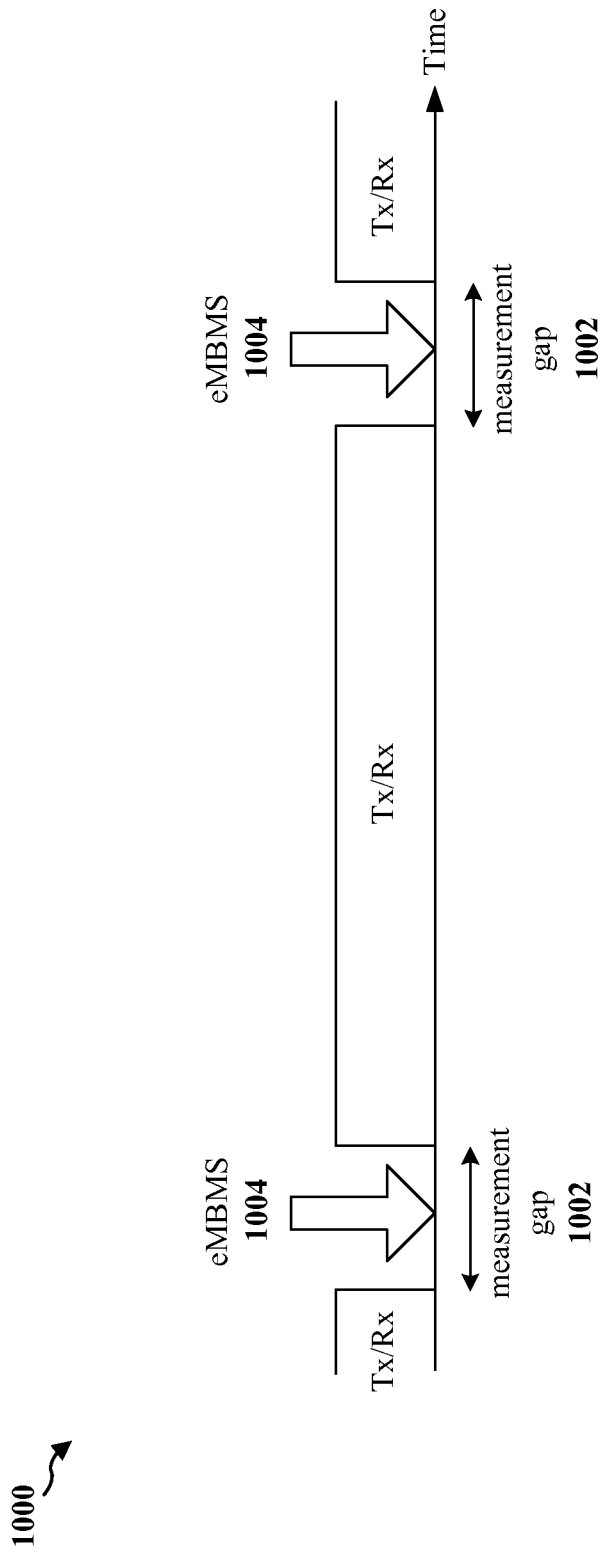
FIG. 10 is a diagram illustrating an overlap between a measurement gap and eMBMS service reception.

FIG. 10 is a diagram 1000 for illustrating an overlap between a measurement gap 1002 and eMBMS content 1004. A serving eNB may command a UE to perform an inter-frequency or inter-RAT measurement while in an RRC_CONNECTED state. The eNB may not know when the UE is receiving eMBMS content. As such, there may be a collision between the measurement gap 1002 for performing the inter-frequency or inter-RAT measurement and the reception of eMBMS content 1004. When the measurement gap 1002 collides with the eMBMS reception, the UE needs to skip one or the other. If the inter-frequency/inter-RAT measurement is skipped, then handover may be delayed or radio link failure may occur with higher probability. If the eMBMS service reception is skipped, then eMBMS data loss may occur and user experience may suffer, even though that eMBMS data may be encoded such that some data loss may be recovered. Techniques are provided infra for prioritizing inter-frequency/inter-RAT measurements and reception of eMBMS content.

Figure 11:
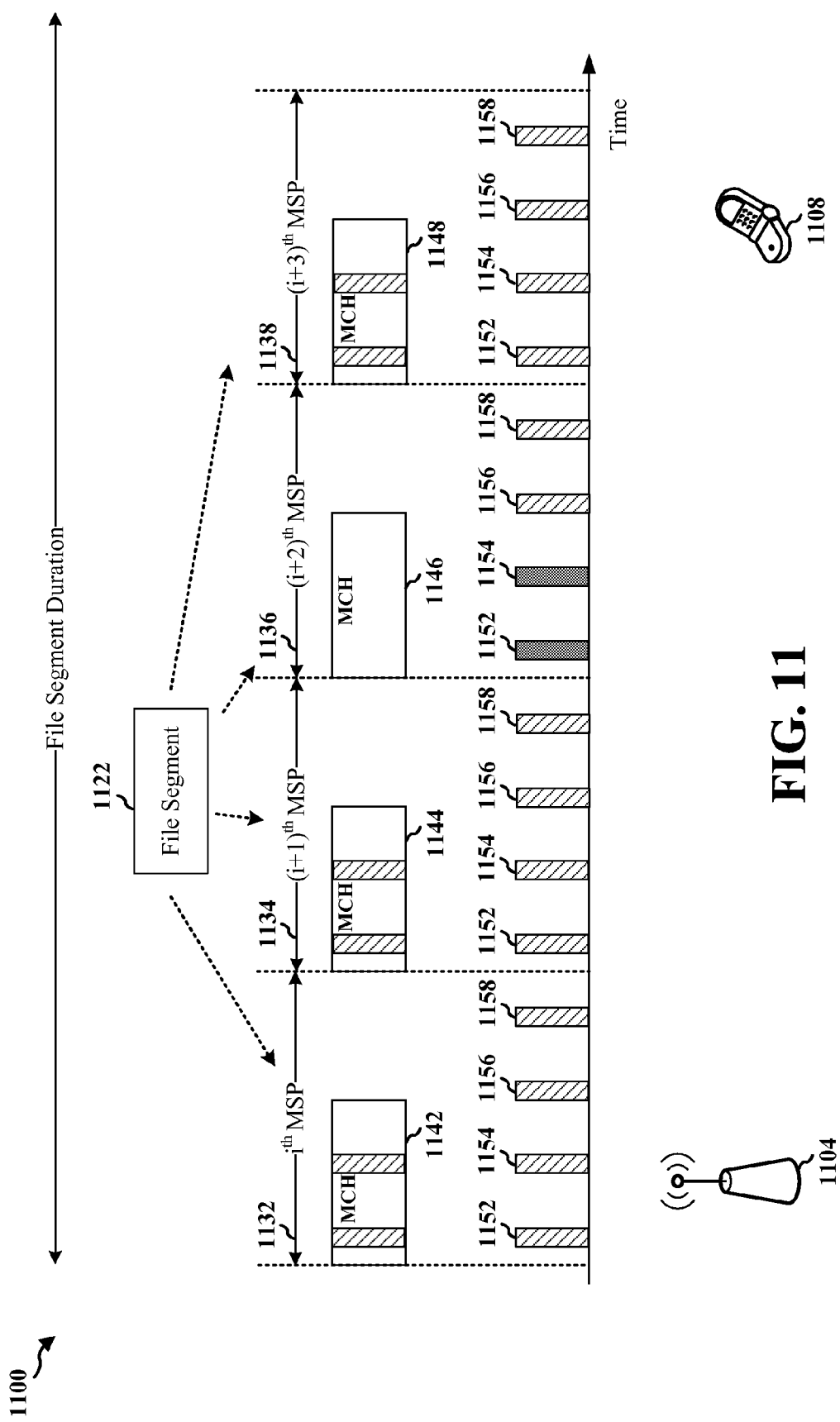
FIG. 11 is a diagram illustrating prioritization of eMBMS service reception and inter-frequency/inter-RAT measurement at a UE.

FIG. 11 is a diagram 1100 illustrating prioritization of eMBMS service reception and inter-frequency/inter-RAT measurement at a UE. An eNB 1104 uses an eMBMS service to deliver a file segment 1122 to a UE 1108 in an eMBMS session. For example, the file segment 1122 may be an audio/video file. For simplicity and clarity, FIG. 11 only shows $i^{th}$ to $(i+3)^{th}$ MCH scheduling periods (MSPs) in the eMBMS session. Each of the $i^{th}$ to $(i+3)^{th}$ MSPs 1132-1138 is used to transmit a respective one of MCH parts A-D 1142, 1144, 1146, 1148. Each of the MCH parts A-D 1142, 1144, 1146, 1148 carries a portion of the file segment 1122. The MCH parts A-D 1142, 1144, 1146, 1148 may belong to the same MCH. MCCH and MTCH may be multiplexed in the MCH. Each of the MCH parts A-D 1142, 1144, 1146, 1148 may include one or more eMBMS subframes.

An MSP may overlap with one or more measurement gaps. In this specific example, each of the $i^{th}$ to $(i+3)^{th}$ MSPs 1132-1138 overlaps with 4 measurement gaps (i.e., measurement gaps A-D 1152, 1154, 1156, 1158 in that MSP). At the beginning of each MSP, the UE 1108 receives MSI indicating which subframes in the MSP are used for a certain MTCH in the upcoming scheduling period. In this example, the MSI in $i^{th}$ to $(i+3)^{th}$ MSPs 1132-1138 indicates the subframes allocated for the MCH parts A-D 1142, 1144, 1146, 1148, respectively. The subframes allocations for the MCH parts A-D 1142, 1144, 1146, 1148 may or may not be the same.

In a particular MSP, after receiving the MSI and determining the MCH allocation, the UE 1108 can then determine whether the MCH in the particular MSP collides with the one or more measurement gaps in the particular MSP. In this example, the UE 1108 determines that each of the MCH parts A-D 1142, 1144, 1146, 1148 collide with the measurement gap A 1152 and the measurement gap B 1154 in the respective MSP of the each MCH part. For example, MCH part A 1142 collides with the measurement gap A 1152 and the measurement gap B 1154 in the $i^{th}$ MSP 1132. The UE 1108 may employ the techniques described infra to decide whether to skip an inter-frequency/inter-RAT measurement or skip eMBMS reception.

In one technique, the UE 1108 can determine the delivery method of an interested eMBMS service carried in the MTCH. If the delivery method is the download method, then the UE 1108 can skip the eMBMS service reception and can perform the inter-frequency/inter-RAT measurement in a measurement gap. Although the UE 1108 may miss some eMBMS subframes by performing the inter-frequency/inter-RAT measurement during the measurement gap, the UE 1108 may use a file repair procedure of the delivery method to repair the file (i.e., to recover the missing data due to missing eMBMS subframes). If the delivery method is the streaming method, then the UE 1108 may further determine whether the eMBMS service reception or the inter-frequency/inter-RAT measurement gets priority depending on the data reception condition at the UE 1108 at the moment.

Depending on the delivery methods (as described supra) or regardless of the delivery methods, the UE 1108 may further determine the priorities of inter-frequency/inter-RAT measurement and eMBMS service reception based on a data receipt metric. The dependency on the delivery methods may be configurable for the UE 1108. More specifically, the UE 1108 may receive a file delivery table (FDT) specifying certain parameters for files to be delivered in the eMBMS session. The parameters may include the total encoding symbols of a particular file (file segment). Accordingly, for the file segment 1122, the UE 1108 may determine the total number of encoding symbols ($N_{tot}$) to be delivered to the UE 1108 in the eMBMS session by examining the indicating parameter in the FDT.

Further, upon receiving one or more eMBMS subframes, the UE 1108 may demodulate the one or more eMBMS subframes to retrieve the encoding symbols carried in the one or more eMBMS subframes. Thus, the UE 1108 may monitor and determine, e.g., using a counter, the number of encoding symbols of the file segment 1122 that have been received in the eMBMS session until the current time ($N_{rx}$).

In addition, upon receiving one or more eMBMS subframes, the UE 1108 may demodulate and decode the one or more eMBMS subframes and then construct the one or more upper layer packets (e.g., FLUTE/UDP/IP packets) carried in the one or more eMBMS subframes. The latest upper layer packet may indicate an ID of the latest encoding symbol used to carry the packet. Comparing the ID of the latest encoding symbol with the ID of the first encoding symbol of the file segment 1122, the UE 1108 may determine an ID-difference number (N), which may indicate the number of encoding symbols that the UE 1108 should have received for the file segment 1122 in the eMBMS session at the current time.

Figure 12:
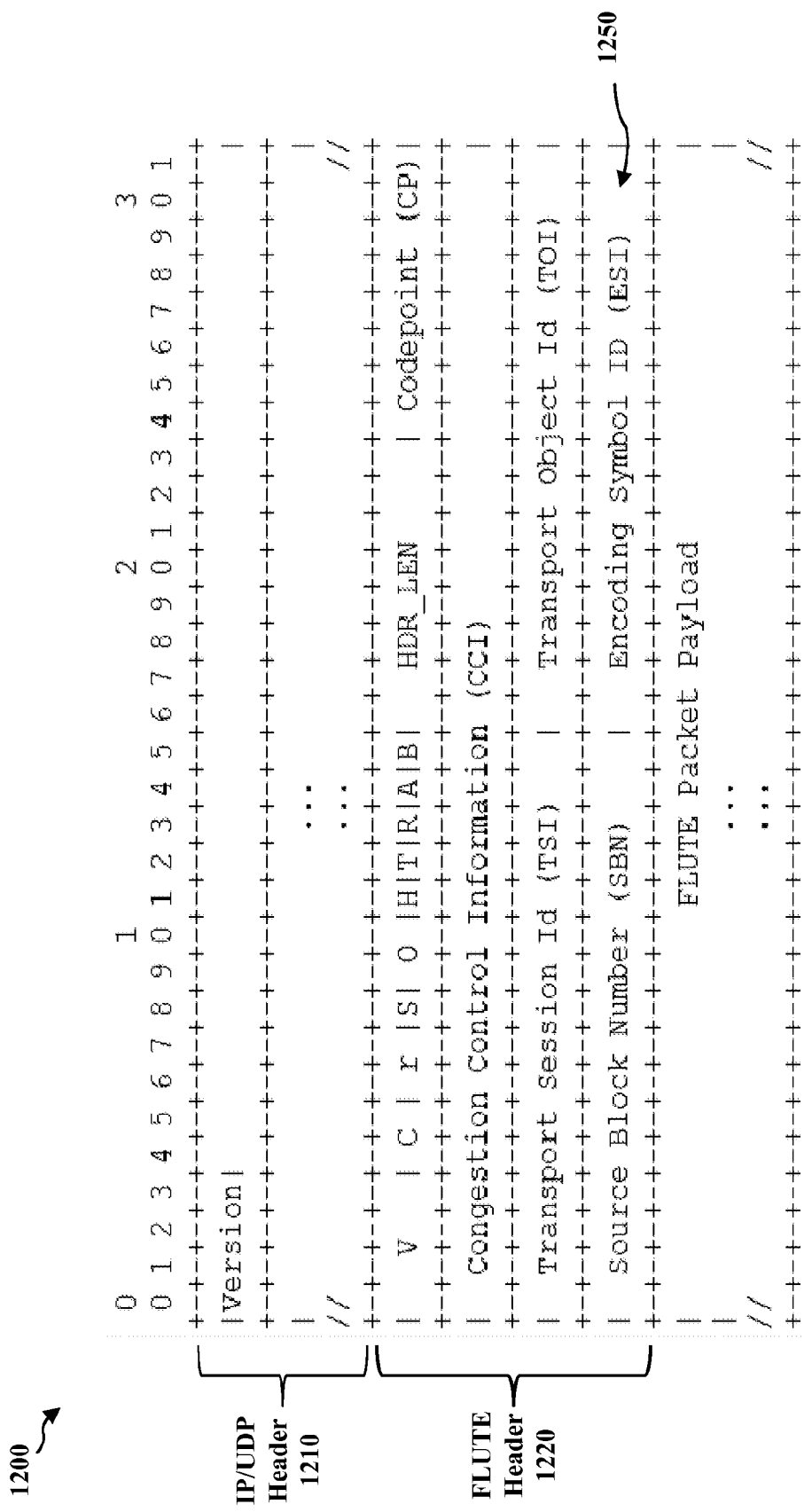
FIG. 12 is a diagram illustrating a format of a file delivery over unidirectional transport (FLUTE)/User Datagram Protocol (UDP)/Internet protocol (IP) packet.

FIG. 12 is a diagram illustrating a format of a FLUTE/UDP/IP packet 1200. The FLUTE/UDP/IP packet 1200 has an IP/UDP header 1210 and a FLUTE header 1220. The FLUTE header 1220 includes an encoding symbol ID (ESI) 1250, which may be used to determine the number of encoding symbols that the UE 1108 should have received for the file segment 1122 described supra.

Referring back to FIG. 11, the UE 1108 may determine an exemplary data receipt metric as follows:

$$R_{rx} = (N_{rx} + (N_{tot} - N))/N_{tot}.$$

($N_{tot}$−N) is the number of encoding symbols to be received at the UE 1108 for the file segment 1122 in the remaining portion of the eMBMS session.

In one technique, the UE 1108 may determine the priorities of the eMBMS service reception and the inter-frequency/inter-RAT measurement colliding at a measurement gap based on $R_{rx}$ in connection with a first threshold ($TH_1$) and a second threshold ($TH_2$). Specifically, if $R_{rx} > TH_1$, the UE 1108 may determine that the inter-frequency/inter-RAT measurement has a higher priority than the eMBMS service reception. Accordingly, the UE 1108 performs inter-frequency/inter-RAT measurement and refrain from performing eMBMS service reception when the eMBMS service reception collides with the inter-frequency/inter-RAT measurement. If $TH_1 \geq R_{rx} \geq TH_2$, the UE 1108 may determine that the eMBMS service reception has a higher priority than the inter-frequency/inter-RAT measurement. Accordingly, the UE 1108 performs eMBMS service reception and refrain from performing inter-frequency/inter-RAT measurement when the eMBMS service reception collides with the inter-frequency/inter-RAT measurement. If $R_{rx} < TH_2$, the UE 1108 may determine that the inter-frequency/inter-RAT measurement has a higher priority than the eMBMS service reception. Accordingly, the UE 1108 performs inter-frequency/inter-RAT measurement and refrain from performing eMBMS service reception when the eMBMS service reception collides with the inter-frequency/inter-RAT measurement.

In one example, $TH_1$ may be 88.8%, and $TH_2$ may be 85.8%. At the measurement gap A 1152 in the $i^{th}$ MSP 1132, the UE 1108 determines that $R_{rx}$ is 99%, which is greater than $TH_1$. Thus, the UE 1108 determines that the inter-frequency/inter-RAT measurement has a higher priority and accordingly performs the inter-frequency/inter-RAT measurement at the measurement gap A 1152. At the measurement gap B 1154 in the $i^{th}$ MSP 1132, the UE 1108 determines that $R_{rx}$ is 96%, which is still greater than $TH_1$. Thus, the UE 1108 determines that the inter-frequency/inter-RAT measurement has a higher priority and accordingly performs the inter-frequency/inter-RAT measurement at the measurement gap B 1154. At the measurement gap C 1156 and the measurement gap D 1158 in the $i^{th}$ MSP 1132, the UE 1108 determines that the measurement gap C 1156 and the measurement gap D 1158 do not collide with the MCH part A 1142. Accordingly, the UE 1108 performs the inter-frequency/inter-RAT measurement at the measurement gap C 1156 and the measurement gap D 1158 in the $i^{th}$ MSP 1132.

At the measurement gap A 1152 in the $(i+1)^{th}$ MSP 1134, the UE 1108 determines that $R_{rx}$ is 93%, which is greater than $TH_1$. Thus, the UE 1108 determines that the inter-frequency/inter-RAT measurement has a higher priority and accordingly performs the inter-frequency/inter-RAT measurement at the measurement gap A 1152. At the measurement gap B 1154 in the $(i+1)^{th}$ MSP 1134, the UE 1108 determines that $R_{rx}$ is 90%, which is still greater than $TH_1$. Thus, the UE 1108 determines that the inter-frequency/inter-RAT measurement has a higher priority and accordingly performs the inter-frequency/inter-RAT measurement at the measurement gap B 1154. At the measurement gap C 1156 and the measurement gap D 1158 in the $(i+1)^{th}$ MSP 1134, the UE 1108 determines that the measurement gap C 1156 and the measurement gap D 1158 do not collide with the MCH part B 1144. Accordingly, the UE 1108 performs the inter-frequency/inter-RAT measurement at the measurement gap C 1156 and the measurement gap D 1158 in the $(i+1)^{th}$ MSP 1134.

At the measurement gap A 1152 in the $(i+2)^{th}$ MSP 1136, the UE 1108 determines that $R_{rx}$ is 87%, which is lower than $TH_1$ and greater than $TH_2$. Thus, the UE 1108 determines that the eMBMS service reception has a higher priority and accordingly performs the eMBMS service reception at the measurement gap A 1152. At the measurement gap B 1154 in the (i+2)$^{th}$ MSP 1136, the UE 1108 determines that R$_{rx}$ is 86%, which is still lower than TH$_1$ and greater than TH$_2$. Thus, the UE 1108 determines that the eMBMS service reception has a higher priority and accordingly performs the eMBMS service reception at the measurement gap B 1154. At the measurement gap C 1156 and the measurement gap D 1158 in the (i+2)$^{th}$ MSP 1136, the UE 1108 determines that the measurement gap C 1156 and the measurement gap D 1158 do not collide with the MCH part C 1146. Accordingly, the UE 1108 performs the inter-frequency/inter-RAT measurement at the measurement gap C 1156 and the measurement gap D 1158 in the (i+2)$^{th}$ MSP 1136.

At the measurement gap B 1154 in the (i+2)$^{th}$ MSP 1136, the UE 1108 determines that R$_{rx}$ is 86%, which is still lower than TH$_1$ and greater than TH$_2$. Thus, the UE 1108 determines that the eMBMS service reception has a higher priority and accordingly performs the eMBMS service reception at the measurement gap B 1154. At the measurement gap C 1156 and the measurement gap D 1158 in the (i+2)$^{th}$ MSP 1136, the UE 1108 determines that the measurement gap C 1156 and the measurement gap D 1158 do not collide with the MCH part C 1146. Accordingly, the UE 1108 performs the inter-frequency/inter-RAT measurement at the measurement gap C 1156 and the measurement gap D 1158 in the (i+2)$^{th}$ MSP 1136.

In this example, when the UE 1108 is receiving the MCH part D 1148, the channel condition at the UE 1108 deteriorates and the block error rate (BLER) may increase significantly. At the measurement gap A 1152 in the (i+3)$^{th}$ MSP 1138, the UE 1108 determines that R$_{rx}$ is 82%, which is lower TH$_2$. Thus, the UE 1108 determines that the inter-frequency/inter-RAT measurement has a higher priority and accordingly performs the inter-frequency/inter-RAT measurement at the measurement gap A 1152. At the measurement gap B 1154 in the (i+3)$^{th}$ MSP 1138, the UE 1108 determines that R$_{rx}$ is 81%, which is still lower than TH$_2$. Thus, the UE 1108 determines that the inter-frequency/inter-RAT measurement has a higher priority and accordingly performs the inter-frequency/inter-RAT measurement at the measurement gap B 1154. At the measurement gap C 1156 and the measurement gap D 1158 in the (i+3)$^{th}$ MSP 1138, the UE 1108 determines that the measurement gap C 1156 and the measurement gap D 1158 do not collide with the MCH part D 1148. Accordingly, the UE 1108 performs the inter-frequency/inter-RAT measurement at the measurement gap C 1156 and the measurement gap D 1158 in the (i+3)$^{th}$ MSP 1138.

Figure 13:
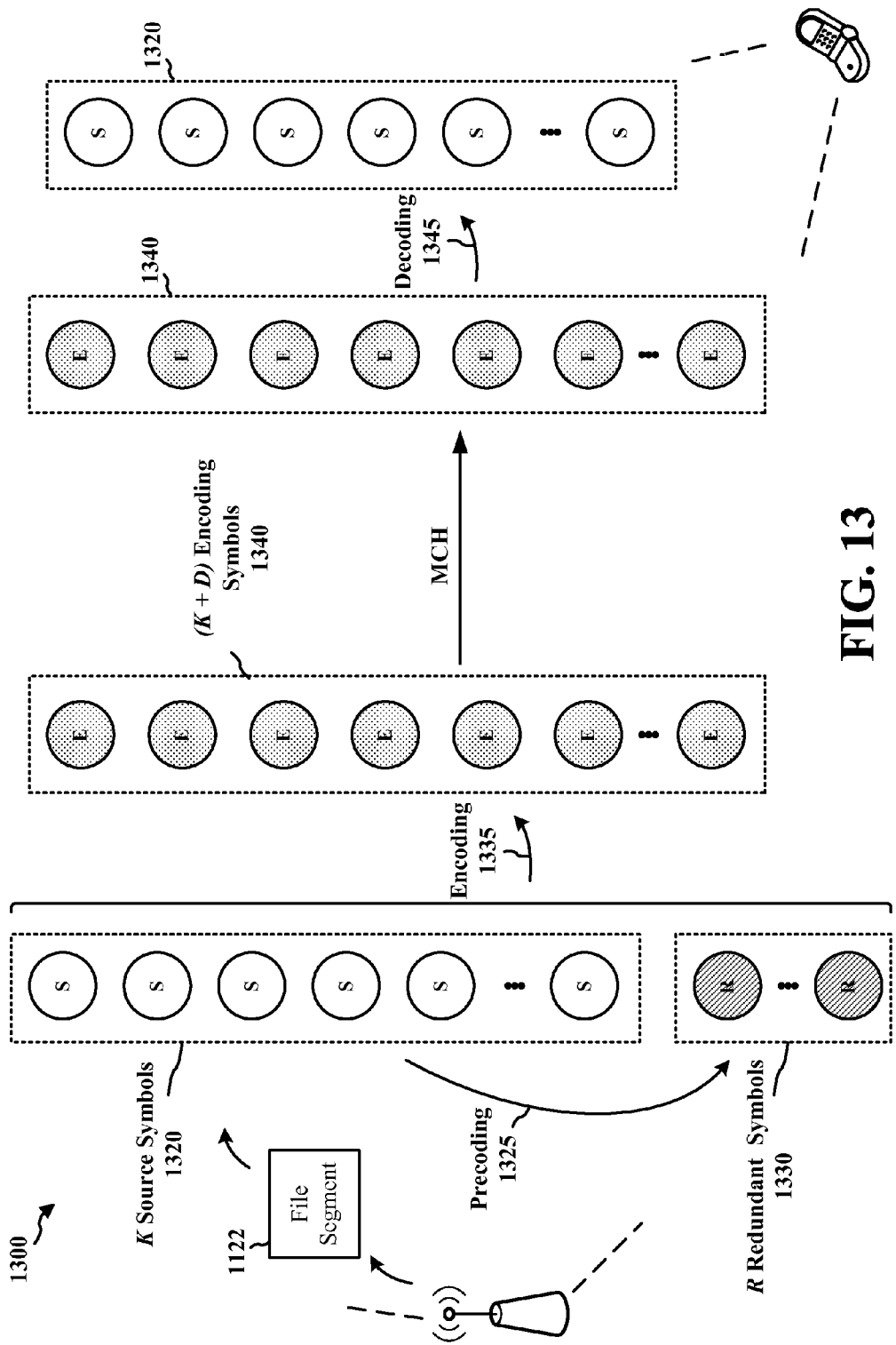
FIG. 13 is a diagram illustrating encoding techniques used for transmitting eMBMS data.

FIG. 13 is a diagram 1300 illustrating encoding techniques used for transmitting eMBMS data. As described supra, the eNB 1104 transmits the file segment 1122 to the UE 1108. More specifically, in order to transmit a portion of the file segment 1122, the eNB 1104 retrieves from the file segment 1122 K source data units that correspond to K source symbols 1320. Each data unit may include a sequence of bits. In a precoding operation 1325, the eNB 1104 generates, using the K source data units, R redundant data units that correspond to R redundant symbols 1330. In an encoding operation 1335, the eNB 1104 encodes the K source data units and the R redundant data units together to generate (K+D) encoding data units. Subsequently, the eNB 1104 modulates the (K+D) encoding data units into (K+D) encoding symbols 1340. The D encoding symbols may be referred to as D additional symbols, which are in addition to K (i.e., the number of source symbols) encoding symbols.

The eNB 1104 then transmits the (K+D) encoding symbols 1340 to the UE 1108 via the MCH parts A-D 1142, 1144, 1146, 1148 carried in eMBMS subframes, as described supra with reference to FIG. 11. Further, as discussed, the eNB 1104 may associate each of the (K+D) encoding symbols 1340 with an ESI and may transmit some of all the ESIs of the (K+D) encoding symbols 1340 to the UE 1108. In the example illustrated in FIG. 12, the eNB 1104 transmits the file segment 1122 to the UE 1108 using one or more FLUTE/UDP/IP packets 1200. The ESI of the initial symbol carried in a FLUTE/UDP/IP packet 1200 is set as the encoding symbol ID (ESI) 1250 of the FLUTE/UDP/IP packet 1200.

The UE 1108 accordingly receives the (K+D) encoding symbols 1340. The UE 1108 demodulates the (K+D) encoding symbols 1340 to generate corresponding data units. In a decoding operation 1345, the UE 1108 decodes the data units obtained from demodulation to generate data units corresponding to the K source symbols 1320.

In certain configurations, the encoding and decoding processes used by the eNB 1104 and the UE 1108, including the precoding operation 1325, the encoding operation 1335, the decoding operation 1345, are implemented in accordance with a forward error correction (FEC) technique such as what is described in the Internet Engineering Task Force (IETF) document "Raptor FEC Schemes for FECFRAME draft-ietf-fecframe-raptor-10," dated Mar. 1, 2012 (Raptor 10).

In certain configurations, the eNB 1104 and/or the UE 1108 can determine TH$_1$ and TH$_2$ in consideration of the precoding operation 1325, the encoding operation 1335, the decoding operation 1345 as follows:

$$TH_2 = (1+A)/(1+\% \ FEC)$$

$$TH_1 = TH_2 + O$$

A is D/K. In other words, A is the percentage of the number of additional symbols (i.e., D) over the number of source symbols (i.e., K) for the UE 1108 to recover. A is 3% for Raptor 10. % FEC is R/K. In other words, % FEC is the percentage of the number of redundant symbols (i.e., R) over the number of source symbols (i.e., K) for the UE 1108 to recover. In this example, % FEC is 20%. O is the percentage margin to leave additional errors that can be still recoverable by FEC. For example, O may be determined in consideration of estimated channel condition degradation. In this example, O is 3%. TH$_2$ may be rewritten as follows:

$$TH_2 = (K+D)/(K+R)$$

As such, in this example and for Raptor 10, TH$_1$ is determined to be 88.8%. TH$_2$ is determined to be 85.8%.

When R$_{rx}$>TH$_1$ (e.g., a high percentage of encoding symbols transmitted to the UE 1108 has been correctly received at the UE 1108), if the UE 1108 perform the inter-frequency/inter-RAT measurement during a measurement gap and misses some eMBMS subframes, it is likely for the UE 1108 to recover the symbols of the missed eMBMS subframes during the measurement gap from the symbols that have been received by the UE 1108.

When TH$_1$≥R$_{rx}$≥TH$_2$ (e.g., a relatively high percentage of encoding symbols transmitted to the UE 1108 have been correctly received at the UE 1108), if the UE 1108 continues receiving encoding symbols transmitted in the measurement gap, it is more likely for the UE 1108 to recover the previously missed symbols (e.g., due to poor channel conditions) from the symbols that have been received by the UE 1108.

When R$_{rx}$<TH$_2$ (e.g., a significant percentage of encoding symbols transmitted to the UE 1108 have not been correctly received at the UE 1108), it is unlikely for the UE 1108 to recover the previously missed symbols from the symbols that have been received by the UE 1108, even if the UE 1108 continues receiving encoding symbols during a measurement gap.

In certain configurations, $TH_1$, $TH_2$, and 0 may be determined at the eNB 1104 and subsequently transmitted to the UE 1108, for example, via SIBs. In certain configurations, $TH_1$, $TH_2$, and O may be determined at the UE 1108. O maybe dynamically determined and configured at the UE 1108 in response to real time channel condition measurements.

Figure 14:
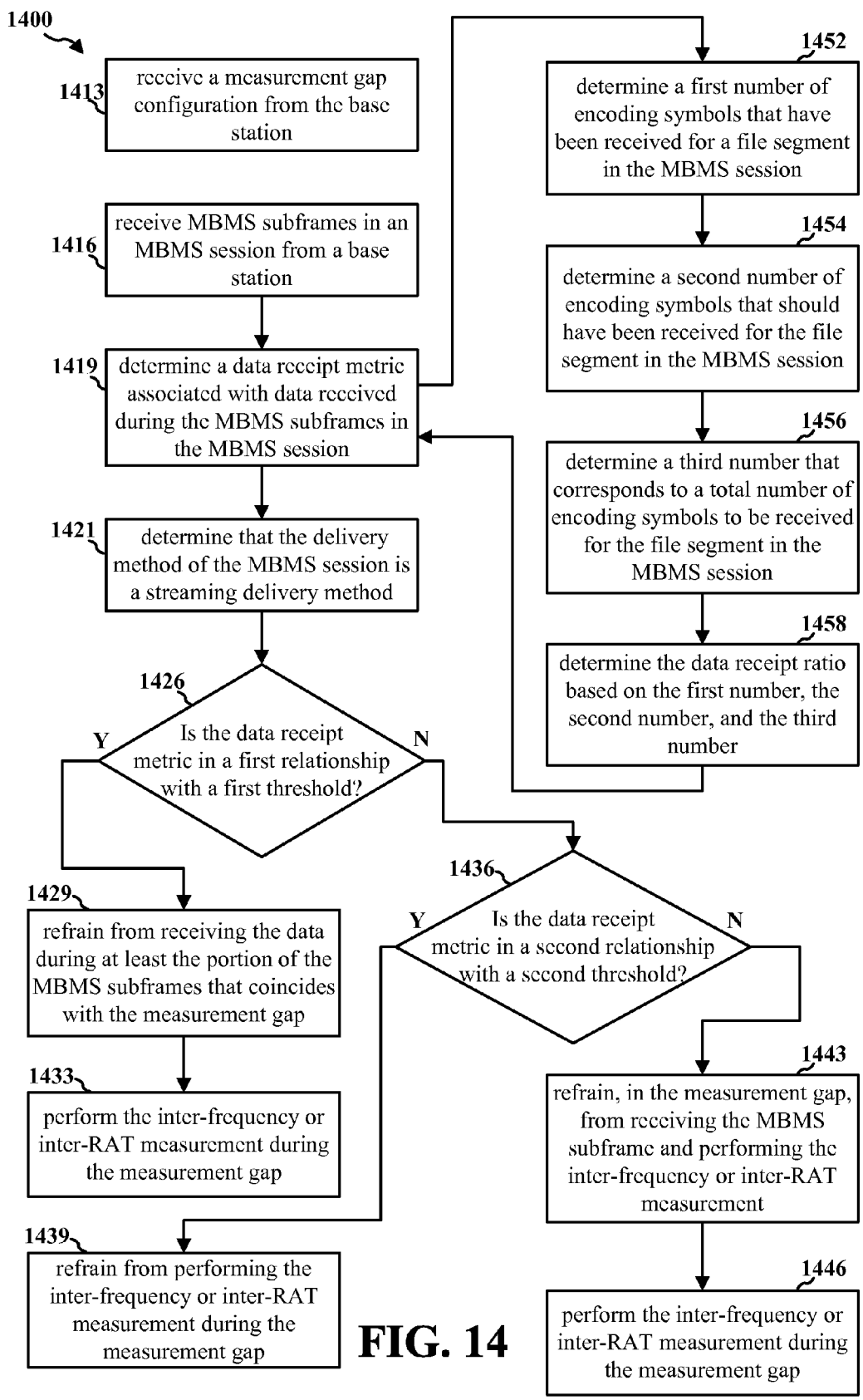
FIG. 14 is a flow chart of a method (process) of prioritization of eMBMS service reception and inter-frequency/inter-RAT measurement.

FIG. 14 is a flow chart 1400 of a method (process) of prioritization of eMBMS service reception and inter-frequency/inter-RAT measurement. The method may be performed by a UE (e.g., the UE 1108, the apparatus 1502/1502'). In certain configurations, the UE may, at operation 1413, receive a measurement gap configuration from a base station. The measurement gap configuration indicates a periodicity for a measurement gap. For example, referring to FIG. 8, the measurement gap 904 is configured in an RRC connection reconfiguration (RRCConnectionReconfiguration) message. The measurement gap may be 6 ms long (i.e., 6 subframes) per 40 ms or 80 ms time period.

At operation 1416, the UE receives MBMS subframes in an MBMS session from the base station. For example, referring to FIG. 11, the UE 1108 receives MCH parts A-D 1142, 1144, 1146, 1148 including eMBMS subframes from the eNB 1104 in an eMBMS session.

At operation 1419, the UE determines a data receipt metric associated with data received during the MBMS subframes in the MBMS session. A portion of the MBMS subframes coincides with a measurement gap configured for inter-frequency or inter-RAT measurement. For example, referring to FIG. 11, the UE 1108 determines $R_{rx}$.

In certain configurations, the data receipt metric is a data receipt ratio. Within operation 1419, the UE may, at operation 1452, determine a first number (e.g., $N_{rx}$) of encoding symbols that have been received for a file segment in the MBMS session. At operation 1454, the UE may determine a second number (e.g., N) of encoding symbols that should have been received for the file segment in the MBMS session. At operation 1456, the UE may determine a third number that corresponds to a total number (e.g., $N_{tot}$) of encoding symbols to be received for the file segment in the MBMS session. At operation 1458, the UE may determine the data receipt ratio based on the first number, the second number, and the third number.

In certain configurations, subsequent to operation 1419, the UE may, at operation 1421, determine that a delivery method of the MBMS session is a streaming delivery method. At operation 1426, the UE determines whether the data receipt metric is in a first relationship with a first threshold. In certain configurations, the first relationship defines that the data receipt ratio is greater than the first threshold. When the data receipt metric is in the first relationship with the first threshold, the UE, at operation 1429, refrains from receiving the data during at least the portion of the MBMS subframes that coincides with the measurement gap. At operation 1433, the UE performs the inter-frequency or inter-RAT measurement during the measurement gap. For example, referring to FIG. 11, the UE 1108 determines whether $R_{rx}$ is greater than $TH_1$. The UE 1108 performs the inter-frequency/inter-RAT measurement at the measurement gap A 1152 in the $(i+1)^{th}$ MSP 1134.

In certain configurations, the first threshold is configured based on (a) D encoding symbols that are received, in addition to K encoding symbols, from the base station in order to recover K source symbols, (b) R redundant symbols that are encoded together with the K source symbols at the base station to provide the D encoding symbols and the K encoding symbols, (c) a channel condition degradation estimation of the UE, or any combination thereof. D, K, and R are integers greater than 0.

In certain configurations, the first threshold is configured based on (a) a percentage of additional encoding symbols relative to a number of encoding symbols received from the base station in order to recover the number of source symbols, (b) a percentage of redundant symbols relative to the number of source symbols and that are encoded together with the number of source symbols at the base station to provide the additional encoding symbols and the number of encoding symbols, (c) a channel condition degradation estimation of the UE, or any combination thereof.

When the data receipt metric is not in the first relationship with the first threshold, in certain configurations, the UE may, at operation 1436, determine whether the data receipt metric is in a second relationship with a second threshold. For example, referring to FIG. 11, the UE 1108 determines whether $R_{rx}$ is greater than $TH_2$.

In certain configurations, the second threshold is configured based on (a) a percentage of additional encoding symbols relative to a number of encoding symbols received from the base station in order to recover the number of source symbols and (b) a percentage of redundant symbols relative to the number of source symbols that are encoded together with the number of source symbols at the base station to provide the additional encoding symbols and the number of encoding symbols, or any combination thereof.

In certain configurations, the data receipt metric is a data receipt ratio. The second relationship defines that the data receipt ratio is greater than the second threshold. When the data receipt metric is in the second relationship with the second threshold, the UE may, at operation 1439, refrain from performing the inter-frequency or inter-RAT measurement during the measurement gap. For example, referring to FIG. 11, the UE 1108 performs the eMBMS service reception at the measurement gap A 1152 in the $(i+2)^{th}$ MSP 1136.

When the data receipt metric is not in the second relationship with the second threshold, the UE may, at operation 1443, refrain, in the measurement gap, from receiving the MBMS subframe. At operation 1446, the UE performs the inter-frequency or inter-RAT measurement during the measurement gap. For example, referring to FIG. 11, the UE 1108 performs the inter-frequency/inter-RAT measurement at the measurement gap A 1152 in the $(i+3)^{th}$ MSP 1138.

Figure 15:
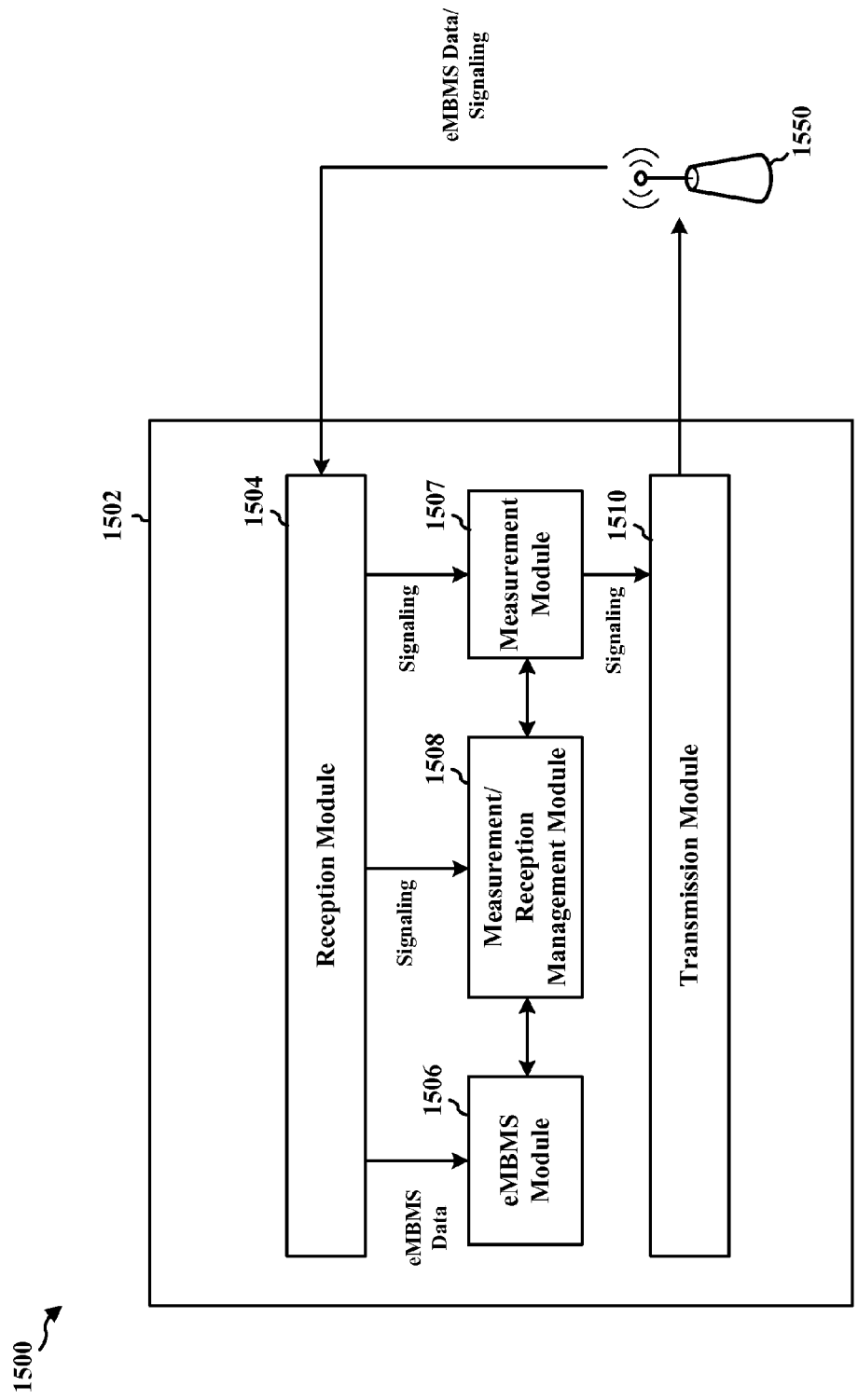
FIG. 15 is a conceptual data flow diagram illustrating a data flow between different modules/means/components in an exemplary apparatus.

FIG. 15 is a conceptual data flow diagram 1500 illustrating the data flow between different modules/means/components in an exemplary apparatus 1502. The apparatus may be a UE. The apparatus includes a reception module 1504, an eMBMS module 1506, a measurement module 1507, a measurement/reception management module 1508, and a transmission module 1510.

The reception module 1504 may be configured to receive MBMS subframes in an MBMS session from a base station 1550. The measurement/reception management module 1508 may be configured to determine a data receipt metric associated with data received during the MBMS subframes in the MBMS session. A portion of the MBMS subframes coincides with a measurement gap configured for inter-frequency or inter-RAT measurement. The measurement/reception management module 1508 may be configured to determine whether the data receipt metric is in a first relationship with a first threshold. The reception module 1504 and/or the measurement/reception management module 1508 may be configured to refrain from receiving the data during at least the portion of the MBMS subframes that coincides with the measurement gap based on a determination that the data receipt metric is in the first relationship with the first threshold. The reception module 1504, the measurement module 1507, and/or the transmission module 1510 may be configured to perform the inter-frequency or inter-RAT measurement during the measurement gap in response to the determination that the data receipt metric is in the first relationship with the first threshold.

In certain configurations, the measurement/reception management module 1508 may be configured to determine a delivery method of the MBMS session. The determining whether the data receipt metric is in the first relationship with the first threshold is performed in response to a determination that the delivery method is a streaming delivery method.

In certain configurations, the data receipt metric is a data receipt ratio. The measurement/reception management module 1508 may be configured to determine a first number of encoding symbols that have been received for a file segment in the MBMS session. The measurement/reception management module 1508 may be configured to determine a second number of encoding symbols that should have been received for the file segment in the MBMS session. The measurement/reception management module 1508 may be configured to determine a third number that corresponds to a total number of encoding symbols to be received for the file segment in the MBMS session. The measurement/reception management module 1508 may be configured to determine the data receipt ratio based on the first number, the second number, and the third number.

In certain configurations, the first relationship defines that the data receipt ratio is greater than the first threshold. In certain configurations, the first threshold is configured based on (a) D encoding symbols that are received, in addition to K encoding symbols, from the base station 1550 in order to recover K source symbols, (b) R redundant symbols that are encoded together with the K source symbols at the base station 1550 to provide the D encoding symbols and the K encoding symbols, (c) a channel condition degradation estimation of the UE, or any combination thereof. D, K, and R are integers greater than 0.

In certain configurations, the first threshold is configured based on (a) a percentage of additional encoding symbols relative to a number of encoding symbols received from the base station 1550 in order to recover the number of source symbols, (b) a percentage of redundant symbols relative to the number of source symbols and that are encoded together with the number of source symbols at the base station 1550 to provide the additional encoding symbols and the number of encoding symbols, (c) a channel condition degradation estimation of the UE, or any combination thereof.

In certain configurations, the reception module 1504, the measurement module 1507, and/or the transmission module 1510 may be configured to refrain from performing the inter-frequency or inter-RAT measurement during the measurement gap in response to a determination that the data receipt metric is not in the first relationship with the first threshold.

In certain configurations, the measurement/reception management module 1508 may be configured to determine whether the data receipt metric is in a second relationship with a second threshold in response to the determination that the data receipt metric is not in the first relationship with the first threshold. The refraining from performing the inter-frequency or inter-RAT measurement is executed in response to a determination that the data receipt metric is in the second relationship with the second threshold.

The reception module 1504, the measurement module 1507, and/or the transmission module 1510 may be configured to refrain, in the measurement gap, from receiving the MBMS subframe and performing the inter-frequency or inter-RAT measurement in response to a determination that the data receipt metric is not in the second relationship with the second threshold.

In certain configurations, the second threshold is configured based on (a) a percentage of additional encoding symbols relative to a number of encoding symbols received from the base station 1550 in order to recover the number of source symbols and (b) a percentage of redundant symbols relative to the number of source symbols that are encoded together with the number of source symbols at the base station 1550 to provide the additional encoding symbols and the number of encoding symbols, or any combination thereof.

In certain configurations, the data receipt metric is a data receipt ratio. The second relationship defines that the data receipt ratio is greater than the second threshold. In certain configurations, the reception module 1504, the measurement/reception management module 1508, and/or the measurement module 1507 may be configured to receive a measurement gap configuration from the base station 1550. The measurement gap configuration indicates a periodicity for the measurement gap.

The apparatus may include additional modules that perform each of the blocks of the algorithm in the aforementioned flowchart of FIG. 14. As such, each block in the aforementioned flowchart of FIG. 14 may be performed by a module and the apparatus may include one or more of those modules. The modules may be one or more hardware components specifically configured to carry out the stated processes/algorithm, implemented by a processor configured to perform the stated processes/algorithm, stored within a computer-readable medium for implementation by a processor, or some combination thereof.

Figure 16:
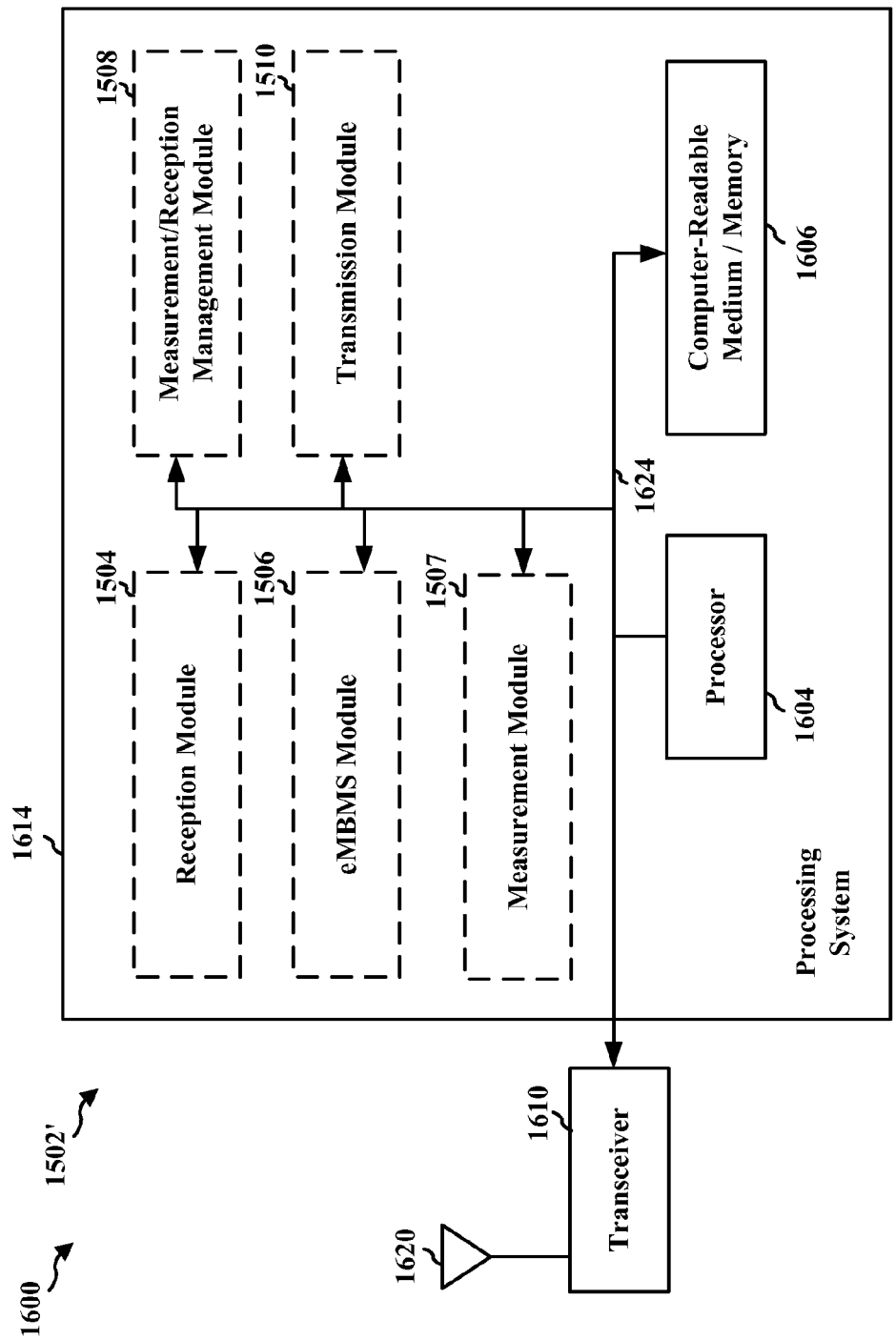
FIG. 16 is a diagram illustrating an example of a hardware implementation for an apparatus employing a processing system.

FIG. 16 is a diagram 1600 illustrating an example of a hardware implementation for an apparatus 1502' employing a processing system 1614. The processing system 1614 may be implemented with a bus architecture, represented generally by the bus 1624. The bus 1624 may include any number of interconnecting buses and bridges depending on the specific application of the processing system 1614 and the overall design constraints. The bus 1624 links together various circuits including one or more processors and/or hardware modules, represented by the processor 1604, the modules 1504, 1506, 1507, 1508, 1510, and the computer-readable medium/memory 1606. The bus 1624 may also link various other circuits such as timing sources, peripherals, voltage regulators, and power management circuits, which are well known in the art, and therefore, will not be described any further.

The processing system 1614 may be coupled to a transceiver 1610. The transceiver 1610 is coupled to one or more antennas 1620. The transceiver 1610 provides a means for communicating with various other apparatus over a transmission medium. The transceiver 1610 receives a signal from the one or more antennas 1620, extracts information from the received signal, and provides the extracted information to the processing system 1614, specifically the reception module 1504. In addition, the transceiver 1610 receives information from the processing system 1614, specifically the transmission module 1510, and based on the received information, generates a signal to be applied to the one or more antennas 1620. The processing system 1614 includes a processor 1604 coupled to a computer-readable medium/memory 1606. The processor 1604 is responsible for general processing, including the execution of software stored on the computer-readable medium/memory 1606. The software, when executed by the processor 1604, causes the processing system 1614 to perform the various functions described supra for any particular apparatus. The computer-readable medium/memory 1606 may also be used for storing data that is manipulated by the processor 1604 when executing software. The processing system further includes at least one of the modules 1504, 1506, 1507, 1508, and 1510. The modules may be software modules running in the processor 1604, resident/stored in the computer readable medium/memory 1606, one or more hardware modules coupled to the processor 1604, or some combination thereof. The processing system 1614 may be a component of the UE 650 and may include the memory 660 and/or at least one of the TX processor 668, the RX processor 656, and the controller/processor 659.

In one configuration, the apparatus 1502/1502' includes means for receiving MBMS subframes in an MBMS session from a base station. The apparatus 1502/1502' includes means for determining a data receipt metric associated with data received during the MBMS subframes in the MBMS session. A portion of the MBMS subframes coincides with a measurement gap configured for inter-frequency or inter-RAT measurement. The apparatus 1502/1502' includes means for determining whether the data receipt metric is in a first relationship with a first threshold. The apparatus 1502/1502' includes means for refraining from receiving the data during at least the portion of the MBMS subframes that coincides with the measurement gap based on a determination that the data receipt metric is in the first relationship with the first threshold. The apparatus 1502/1502' includes means for performing the inter-frequency or inter-RAT measurement during the measurement gap in response to the determination that the data receipt metric is in the first relationship with the first threshold. The apparatus 1502/1502' includes means for determining a delivery apparatus of the MBMS session. The determining whether the data receipt metric is in the first relationship with the first threshold is performed in response to a determination that the delivery apparatus is a streaming delivery apparatus.

The data receipt metric may be a data receipt ratio. The apparatus 1502/1502' may include means for determining a first number of encoding symbols that have been received for a file segment in the MBMS session. The apparatus 1502/1502' may include means for determining a second number of encoding symbols that should have been received for the file segment in the MBMS session. The apparatus 1502/1502' may include means for determining a third number that corresponds to a total number of encoding symbols to be received for the file segment in the MBMS session. The apparatus 1502/1502' may include means for determining the data receipt ratio based on the first number, the second number, and the third number. The first relationship defines that the data receipt ratio is greater than the first threshold.

The first threshold is configured based on (a) D encoding symbols that are received, in addition to K encoding symbols, from the base station in order to recover K source symbols, (b) R redundant symbols that are encoded together with the K source symbols at the base station to provide the D encoding symbols and the K encoding symbols, (c) a channel condition degradation estimation of the UE, or any combination thereof. D, K, and R are integers greater than 0.

The first threshold is configured based on (a) a percentage of additional encoding symbols relative to a number of encoding symbols received from the base station in order to recover the number of source symbols, (b) a percentage of redundant symbols relative to the number of source symbols and that are encoded together with the number of source symbols at the base station to provide the additional encoding symbols and the number of encoding symbols, (c) a channel condition degradation estimation of the UE, or any combination thereof.

The apparatus 1502/1502' may include means for refraining from performing the inter-frequency or inter-RAT measurement during the measurement gap in response to a determination that the data receipt metric is not in the first relationship with the first threshold. The apparatus 1502/1502' may include means for determining whether the data receipt metric is in a second relationship with a second threshold in response to the determination that the data receipt metric is not in the first relationship with the first threshold. The refraining from performing the inter-frequency or inter-RAT measurement is executed in response to a determination that the data receipt metric is in the second relationship with the second threshold.

The apparatus 1502/1502' may include means for refraining, in the measurement gap, from receiving the MBMS subframe and performing the inter-frequency or inter-RAT measurement in response to a determination that the data receipt metric is not in the second relationship with the second threshold.

The second threshold is configured based on (a) a percentage of additional encoding symbols relative to a number of encoding symbols received from the base station in order to recover the number of source symbols and (b) a percentage of redundant symbols relative to the number of source symbols that are encoded together with the number of source symbols at the base station to provide the additional encoding symbols and the number of encoding symbols, or any combination thereof.

The data receipt metric is a data receipt ratio. The second relationship defines that the data receipt ratio is greater than the second threshold. The apparatus 1502/1502' may include means for receiving a measurement gap configuration from the base station. The measurement gap configuration indicates a periodicity for the measurement gap.

The aforementioned means may be one or more of the aforementioned modules of the apparatus 1502 and/or the processing system 1614 of the apparatus 1502' configured to perform the functions recited by the aforementioned means. As described supra, the processing system 1614 may include the TX Processor 668, the RX Processor 656, and the controller/processor 659. As such, in one configuration, the aforementioned means may be the TX Processor 668, the RX Processor 656, and the controller/processor 659 configured to perform the functions recited by the aforementioned means.

It is understood that the specific order or hierarchy of blocks in the processes/flowcharts disclosed is an illustration of exemplary approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "at least one of A, B, and C," and "A, B, C, or any combination thereof" include any combination of A, B, and/or C, and may include multiples of A, multiples of B, or multiples of C. Specifically, combinations such as "at least one of A, B, or C," "at least one of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. A method of wireless communication at a user equipment (UE), comprising:
   receiving multimedia broadcast multicast service (MBMS) subframes in an MBMS session from a base station;
   determining a data receipt metric corresponding to a data receipt ratio associated with data received during the MBMS subframes in the MBMS session, wherein a portion of the MBMS subframes coincides with a measurement gap configured for inter-frequency or inter-radio access technology (RAT) measurement, wherein determining the data receipt metric includes:
   determining a first number of encoding symbols that have been received for a file segment in the MBMS session;
   determining a second number of encoding symbols that should have been received for the file segment in the MBMS session;
   determining a third number that corresponds to a total number of encoding symbols to be received for the file segment in the MBMS session; and
   determining the data receipt ratio based on the first number, the second number, and the third number;
   determining whether the data receipt metric is in a first relationship with a first threshold;
   refraining from receiving the data during at least the portion of the MBMS subframes that coincides with the measurement gap based on a determination that the data receipt metric is in the first relationship with the first threshold; and
   performing the inter-frequency or inter-RAT measurement during the measurement gap in response to the determination that the data receipt metric is in the first relationship with the first threshold.

2. The method of claim 1, further comprising determining a delivery method of the MBMS session, wherein the determining whether the data receipt metric is in the first relationship with the first threshold is performed in response to a determination that the delivery method is a streaming delivery method.

3. The method of claim 1, wherein the first relationship defines that the data receipt ratio is greater than the first threshold.

4. The method of claim 1, wherein the first threshold is configured based on (a) D encoding symbols that are received, in addition to K encoding symbols, from the base station in order to recover K source symbols, (b) R redundant symbols that are encoded together with the K source symbols at the base station to provide the D encoding symbols and the K encoding symbols, (c) a channel condition degradation estimation of the UE, or any combination thereof, wherein D, K, and R are integers greater than 0.

5. The method of claim 1, wherein the first threshold is configured based on (a) a percentage of additional encoding symbols relative to a number of encoding symbols received from the base station in order to recover the number of source symbols, (b) a percentage of redundant symbols relative to the number of source symbols and that are encoded together with the number of source symbols at the base station to provide the additional encoding symbols and the number of encoding symbols, (c) a channel condition degradation estimation of the UE, or any combination thereof.

6. The method of claim 1, further comprising refraining from performing the inter-frequency or inter-RAT measurement during the measurement gap in response to a determination that the data receipt metric is not in the first relationship with the first threshold.

7. The method of claim 6, further comprising:
   determining whether the data receipt metric is in a second relationship with a second threshold in response to the determination that the data receipt metric is not in the first relationship with the first threshold, wherein the refraining from performing the inter-frequency or inter-RAT measurement is executed in response to a determination that the data receipt metric is in the second relationship with the second threshold; and
   refraining, in the measurement gap, from receiving the MBMS subframe and performing the inter-frequency or inter-RAT measurement in response to a determination that the data receipt metric is not in the second relationship with the second threshold.

8. The method of claim 7, wherein the second threshold is configured based on (a) a percentage of additional encoding symbols relative to a number of encoding symbols received from the base station in order to recover the number of source symbols and (b) a percentage of redundant symbols relative to the number of source symbols that are encoded together with the number of source symbols at the base station to provide the additional encoding symbols and the number of encoding symbols, or any combination thereof.

9. The method of claim 8, wherein the data receipt metric is a data receipt ratio, and wherein the second relationship defines that the data receipt ratio is greater than the second threshold.

10. The method of claim 1, further comprising receiving a measurement gap configuration from the base station, wherein the measurement gap configuration indicates a periodicity for the measurement gap.

11. An apparatus for wireless communication, the apparatus being a user equipment (UE), comprising:
means for receiving multimedia broadcast multicast service (MBMS) subframes in an MBMS session from a base station;
means for determining a data receipt metric corresponding to a data receipt ratio associated with data received during the MBMS subframes in the MBMS session, wherein a portion of the MBMS subframes coincides with a measurement gap configured for inter-frequency or inter-radio access technology (RAT) measurement, wherein determining the data receipt metric includes:
means for determining a first number of encoding symbols that have been received for a file segment in the MBMS session;
means for determining a second number of encoding symbols that should have been received for the file segment in the MBMS session;
means for determining a third number that corresponds to a total number of encoding symbols to be received for the file segment in the MBMS session; and
means for determining the data receipt ratio based on the first number, the second number, and the third number;
means for determining whether the data receipt metric is in a first relationship with a first threshold;
means for refraining from receiving the data during at least the portion of the MBMS subframes that coincides with the measurement gap based on a determination that the data receipt metric is in the first relationship with the first threshold; and
means for performing the inter-frequency or inter-RAT measurement during the measurement gap in response to the determination that the data receipt metric is in the first relationship with the first threshold.

12. The apparatus of claim 11, further comprising means for determining a delivery apparatus of the MBMS session, wherein the determining whether the data receipt metric is in the first relationship with the first threshold is performed in response to a determination that the delivery apparatus is a streaming delivery apparatus.

13. The apparatus of claim 11, wherein the first relationship defines that the data receipt ratio is greater than the first threshold.

14. The apparatus of claim 11, wherein the first threshold is configured based on (a) D encoding symbols that are received, in addition to K encoding symbols, from the base station in order to recover K source symbols, (b) R redundant symbols that are encoded together with the K source symbols at the base station to provide the D encoding symbols and the K encoding symbols, (c) a channel condition degradation estimation of the UE, or any combination thereof, wherein D, K, and R are integers greater than 0.

15. The apparatus of claim 11, wherein the first threshold is configured based on (a) a percentage of additional encoding symbols relative to a number of encoding symbols received from the base station in order to recover the number of source symbols, (b) a percentage of redundant symbols relative to the number of source symbols and that are encoded together with the number of source symbols at the base station to provide the additional encoding symbols and the number of encoding symbols, (c) a channel condition degradation estimation of the UE, or any combination thereof.

16. The apparatus of claim 11, further comprising means for refraining from performing the inter-frequency or inter-RAT measurement during the measurement gap in response to a determination that the data receipt metric is not in the first relationship with the first threshold.

17. The apparatus of claim 16, further comprising:
means for determining whether the data receipt metric is in a second relationship with a second threshold in response to the determination that the data receipt metric is not in the first relationship with the first threshold, wherein the refraining from performing the inter-frequency or inter-RAT measurement is executed in response to a determination that the data receipt metric is in the second relationship with the second threshold; and
means for refraining, in the measurement gap, from receiving the MBMS subframe and performing the inter-frequency or inter-RAT measurement in response to a determination that the data receipt metric is not in the second relationship with the second threshold.

18. The apparatus of claim 17, wherein the second threshold is configured based on (a) a percentage of additional encoding symbols relative to a number of encoding symbols received from the base station in order to recover the number of source symbols and (b) a percentage of redundant symbols relative to the number of source symbols that are encoded together with the number of source symbols at the base station to provide the additional encoding symbols and the number of encoding symbols, or any combination thereof.

19. The apparatus of claim 18, wherein the data receipt metric is a data receipt ratio, and wherein the second relationship defines that the data receipt ratio is greater than the second threshold.

20. The apparatus of claim 11, further comprising means for receiving a measurement gap configuration from the base station, wherein the measurement gap configuration indicates a periodicity for the measurement gap.

21. An apparatus for wireless communication, the apparatus being a user equipment (UE), comprising:
a memory; and
at least one processor coupled to the memory and configured to:
receive multimedia broadcast multicast service (MBMS) subframes in an MBMS session from a base station;
determine a data receipt metric corresponding to a data receipt ratio associated with data received during the MBMS subframes in the MBMS session, wherein a portion of the MBMS subframes coincides with a measurement gap configured for inter-frequency or inter-radio access technology (RAT) measurement, wherein to determine the data receipt metric, the at least one processor is further configured to:
determine a first number of encoding symbols that have been received for a file segment in the MBMS session;
determine a second number of encoding symbols that should have been received for the file segment in the MBMS session;
determine a third number that corresponds to a total number of encoding symbols to be received for the file segment in the MBMS session; and
determine the data receipt ratio based on the first number, the second number, and the third number;
determine whether the data receipt metric is in a first relationship with a first threshold;

refrain from receiving the data during at least the portion of the MBMS subframes that coincides with the measurement gap based on a determination that the data receipt metric is in the first relationship with the first threshold; and perform the inter-frequency or inter-RAT measurement during the measurement gap in response to the determination that the data receipt metric is in the first relationship with the first threshold.

22. The apparatus of claim 21, wherein the first threshold is configured based on (a) D encoding symbols that are received, in addition to K encoding symbols, from the base station in order to recover K source symbols, (b) R redundant symbols that are encoded together with the K source symbols at the base station to provide the D encoding symbols and the K encoding symbols, (c) a channel condition degradation estimation of the UE, or any combination thereof, wherein D, K, and R are integers greater than 0.

23. The apparatus of claim 21, wherein the first threshold is configured based on (a) a percentage of additional encoding symbols relative to a number of encoding symbols received from the base station in order to recover the number of source symbols, (b) a percentage of redundant symbols relative to the number of source symbols and that are encoded together with the number of source symbols at the base station to provide the additional encoding symbols and the number of encoding symbols, (c) a channel condition degradation estimation of the UE, or any combination thereof.

24. The apparatus of claim 21, wherein the at least one processor is further configured to:
determine whether the data receipt metric is in a second relationship with a second threshold in response to the determination that the data receipt metric is not in the first relationship with the first threshold,
refrain, in the measurement gap, from performing the inter-frequency or inter-RAT measurement in response to a determination that the data receipt metric is in the second relationship with the second threshold; and
refrain, in the measurement gap, from receiving the MBMS subframe and performing the inter-frequency or inter-RAT measurement in response to a determination that the data receipt metric is not in the second relationship with the second threshold.

25. The apparatus of claim 24, wherein the second threshold is configured based on (a) a percentage of additional encoding symbols relative to a number of encoding symbols received from the base station in order to recover the number of source symbols and (b) a percentage of redundant symbols relative to the number of source symbols that are encoded together with the number of source symbols at the base station to provide the additional encoding symbols and the number of encoding symbols, or any combination thereof.

26. The apparatus of claim 25, wherein the data receipt metric is a data receipt ratio, and wherein the second relationship defines that the data receipt ratio is greater than the second threshold.

27. A non-transitory computer-readable medium storing computer executable code for wireless communication, comprising code for:
receiving multimedia broadcast multicast service (MBMS) subframes in an MBMS session from a base station;
determining a data receipt metric corresponding to a data receipt ratio associated with data received during the MBMS subframes in the MBMS session, wherein a portion of the MBMS subframes coincides with a measurement gap configured for inter-frequency or inter-radio access technology (RAT) measurement, wherein determining the data receipt metric includes:
determining a first number of encoding symbols that have been received for a file segment in the MBMS session;
determining a second number of encoding symbols that should have been received for the file segment in the MBMS session;
determining a third number that corresponds to a total number of encoding symbols to be received for the file segment in the MBMS session; and
determining the data receipt ratio based on the first number, the second number, and the third number;
determining whether the data receipt metric is in a first relationship with a first threshold;
refraining from receiving the data during at least the portion of the MBMS subframes that coincides with the measurement gap based on a determination that the data receipt metric is in the first relationship with the first threshold; and
performing the inter-frequency or inter-RAT measurement during the measurement gap in response to the determination that the data receipt metric is in the first relationship with the first threshold.

* * * * *